(12) United States Patent
Gostylla et al.

(10) Patent No.: US 11,167,340 B2
(45) Date of Patent: Nov. 9, 2021

(54) NOSE ARRANGEMENTS FOR FASTENER SETTING MACHINES, AND RELATED METHODS

(71) Applicant: Atlas Copco IAS UK Limited, Flintshire (GB)

(72) Inventors: Wojciech Gostylla, Flintshire (GB); Stuart Edmond Blacket, Flintshire (GB)

(73) Assignee: Atlas Copco IAS UK Limited, Flinktshire (GB)

( * ) Notice: Subject to any disclaimer, the term of this patent is extended or adjusted under 35 U.S.C. 154(b) by 0 days.

(21) Appl. No.: 16/770,099

(22) PCT Filed: Dec. 5, 2018

(86) PCT No.: PCT/GB2018/053526
§ 371 (c)(1),
(2) Date: Jun. 5, 2020

(87) PCT Pub. No.: WO2019/110992
PCT Pub. Date: Jun. 13, 2019

(65) Prior Publication Data
US 2020/0384526 A1 Dec. 10, 2020

(30) Foreign Application Priority Data
Dec. 5, 2017 (GB) ..................... 1720277

(51) Int. Cl.
*B21J 15/32* (2006.01)
*B21J 15/10* (2006.01)
(Continued)

(52) U.S. Cl.
CPC ............. *B21J 15/32* (2013.01); *B21J 15/105* (2013.01); *B23P 19/001* (2013.01);
(Continued)

(58) Field of Classification Search
CPC ..... B23P 19/001; B23P 19/002; B23P 19/003; B23P 19/004; B23P 19/005; B23P 19/006;
(Continued)

(56) References Cited

U.S. PATENT DOCUMENTS 1,839,490 A 1/1932 Moeller
2,186,841 A 1/1940 Rylander
(Continued)

FOREIGN PATENT DOCUMENTS

CN 102873440 B 11/2014
CN 105665607 A 6/2016
(Continued)

OTHER PUBLICATIONS

Henrob, "Innovative Joining Solutions," brochure publicly available at least as early as Nov. 25, 2020 (2 pages).
(Continued)

*Primary Examiner* — Matthew P Travers
(74) *Attorney, Agent, or Firm* — Michael Best & Friedrich LLP

(57) ABSTRACT

A nose arrangement for a fastener setting tool having a punch for setting fasteners comprises a support that receives the punch and a nosepiece for guiding the punch and a fastener during a fastener setting operation. The nose arrangement defines first and second fastener transfer areas where wait to be transferred under the punch. A transfer mechanism transfers the fasteners from the first and second fastener transfer areas under the punch and comprises a movable member that can be moved between first and second configurations. In the first configuration the movable member holds a first fastener in a stand-by position under the punch while it collects a second fastener from the first fastener transfer area. In the second configuration, the mov-
(Continued)

able member holds the second fastener in the stand-by position while it collects a third fastener from the second fastener transfer area.

20 Claims, 26 Drawing Sheets

(51) Int. Cl.
  *B23P 19/00* (2006.01)
  *B21J 15/02* (2006.01)
(52) U.S. Cl.
  CPC .......... *B23P 19/002* (2013.01); *B23P 19/003* (2013.01); *B21J 15/025* (2013.01); *B23P 19/006* (2013.01)
(58) Field of Classification Search
  CPC ....... B23P 19/06; B23P 19/062; B21J 15/025; B21J 15/10; B21J 15/105; B21J 15/32
  See application file for complete search history.

(56) References Cited

U.S. PATENT DOCUMENTS

| | | | |
|---|---|---|---|
| 2,366,448 A | 1/1945 | Greene et al. | |
| 2,611,911 A | 9/1952 | Graham et al. | |
| 2,689,589 A * | 9/1954 | Allen | B23P 19/007 81/57.37 |
| 2,766,763 A | 10/1956 | Shough | |
| 3,868,148 A | 2/1975 | Schultz | |
| 4,278,194 A | 7/1981 | Ersoy | |
| 4,705,201 A | 11/1987 | Bennett | |
| 4,815,343 A * | 3/1989 | Sofinowski | B23P 19/006 81/431 |
| 4,830,547 A | 5/1989 | Boob et al. | |
| 5,054,649 A | 10/1991 | Lemaire et al. | |
| 5,142,774 A | 9/1992 | Jeffrey | |
| 5,172,467 A | 12/1992 | Muller | |
| 5,385,434 A | 1/1995 | Quinn et al. | |
| 5,465,868 A | 11/1995 | Bonomi | |
| 5,566,446 A | 10/1996 | Luckhardt et al. | |
| 5,620,520 A | 4/1997 | Duffy et al. | |
| 5,733,089 A | 3/1998 | Albright | |
| 5,813,114 A | 9/1998 | Blacket et al. | |
| 6,145,726 A | 11/2000 | Hoof | |
| 6,253,448 B1 | 7/2001 | Zieve et al. | |
| 6,260,734 B1 | 7/2001 | Auriol et al. | |
| 6,328,180 B1 | 12/2001 | Sorensen et al. | |
| 6,949,057 B2 | 9/2005 | Everson et al. | |
| 6,951,298 B1 | 10/2005 | Coglet et al. | |
| 6,964,094 B2 | 11/2005 | Kondo | |
| 6,986,440 B2 | 1/2006 | Ammond et al. | |
| 7,458,244 B2 | 12/2008 | Dehike et al. | |
| 7,810,231 B2 | 10/2010 | Naitoh | |
| 7,849,579 B2 | 12/2010 | Craythorn et al. | |
| 8,141,761 B2 | 3/2012 | Draht et al. | |
| 8,690,037 B2 | 4/2014 | Wenzel et al. | |
| 8,695,187 B2 | 4/2014 | Schmidt | |
| 9,120,214 B2 | 9/2015 | Vandenberg | |
| 9,162,277 B2 | 10/2015 | Flis et al. | |
| 9,387,557 B2 | 7/2016 | Doo et al. | |
| 9,409,227 B2 | 8/2016 | Ivo et al. | |
| 9,610,632 B2 | 4/2017 | Schug et al. | |
| 2004/0217144 A1* | 11/2004 | Matthews | B21J 15/28 227/119 |
| 2005/0051569 A1 | 3/2005 | Ammond et al. | |
| 2005/0121015 A1 | 6/2005 | Postorvo, Jr. | |
| 2007/0289354 A1 | 12/2007 | Reiter | |
| 2011/0252927 A1* | 10/2011 | Ota | B23P 19/005 81/430 |
| 2011/0289769 A1 | 12/2011 | Skolaude | |
| 2011/0290848 A1 | 12/2011 | Wenzel et al. | |
| 2012/0017728 A1 | 1/2012 | Schmidt | |
| 2012/0067176 A1* | 3/2012 | Ota | B25B 23/08 81/57.37 |
| 2012/0301262 A1 | 11/2012 | Ivo et al. | |
| 2013/0071209 A1 | 3/2013 | Schug et al. | |
| 2014/0076913 A1 | 3/2014 | Neumeier et al. | |
| 2015/0184689 A1 | 7/2015 | Godfrey et al. | |
| 2017/0072521 A1 | 3/2017 | Munstermann et al. | |

FOREIGN PATENT DOCUMENTS

| | | | |
|---|---|---|---|
| DE | 2826418 A1 | 7/1981 | |
| DE | 3301243 A1 | 7/1984 | |
| DE | 3503408 A1 | 8/1986 | |
| DE | 3930999 A1 | 3/1991 | |
| DE | 4310953 A1 | 10/1994 | |
| DE | 19538812 A1 | 6/1996 | |
| DE | 19700271 A1 | 9/1997 | |
| DE | 19731344 A1 | 12/1998 | |
| DE | 19756798 A1 | 6/1999 | |
| DE | 19842103 A1 | 3/2000 | |
| DE | 19545672 C2 | 8/2001 | |
| DE | 10064241 A1 | 7/2002 | |
| DE | 102004011846 A1 * | 9/2004 | ............ B21J 15/32 |
| DE | 10335085 A1 | 2/2005 | |
| DE | 202005018786 U | 3/2006 | |
| DE | 102005015032 A1 | 10/2006 | |
| DE | 102009013725 A1 | 9/2010 | |
| DE | 102009040764 A1 | 3/2011 | |
| DE | 102011103332 A1 | 11/2012 | |
| DE | 102011105841 A1 | 12/2012 | |
| DE | 102014011608 A1 | 3/2015 | |
| DE | 102013000799 B4 | 5/2015 | |
| DE | 102015216093 A1 | 3/2017 | |
| DE | 102016224559 A1 | 6/2018 | |
| EP | 0511093 A1 | 10/1992 | |
| EP | 0536779 A1 | 4/1993 | |
| EP | 0703037 A1 | 3/1996 | |
| EP | 0633825 B1 | 4/1997 | |
| EP | 0813463 B1 | 1/2005 | |
| EP | 1270113 B1 | 12/2006 | |
| EP | 1759785 B1 | 12/2008 | |
| EP | 1690613 B1 | 6/2010 | |
| EP | 2308613 A1 | 4/2011 | |
| EP | 2754512 B1 | 9/2015 | |
| EP | 3141318 A1 | 3/2017 | |
| EP | 3308905 A1 | 4/2018 | |
| FR | 2896173 A1 | 7/2007 | |
| GB | 1248411 A | 10/1971 | |
| GB | 1303572 A | 1/1973 | |
| GB | 2456560 A | 7/2009 | |
| JP | S6026520 A | 2/1985 | |
| JP | S60137715 A | 7/1985 | |
| JP | H0616225 A | 1/1994 | |
| JP | H10291131 A1 | 11/1998 | |
| WO | 8404710 A1 | 12/1984 | |
| WO | 1994000257 A1 | 1/1994 | |
| WO | 9528242 A1 | 10/1995 | |
| WO | 9748510 A1 | 12/1997 | |
| WO | 0007751 A1 | 2/2000 | |
| WO | 2006103263 A1 | 10/2006 | |
| WO | 2007132195 A1 | 11/2007 | |
| WO | 2010041018 A1 | 4/2010 | |
| WO | 2014009753 A1 | 1/2014 | |
| WO | 2016193140 A1 | 12/2016 | |
| WO | 2017094324 A1 | 6/2017 | |

OTHER PUBLICATIONS

Atlas Copco, "Self-Pierce Riveting Equipment Guide: Servo Systems," brochure publicly available at least as early as Nov. 25, 2020, pp. 1, 6, 7, 9, and 20 (5 pages).
Henrob, "Self-pierce Riveting Products," brochure publicly available at least as early as Nov. 25, 2020, pp. 1 and 16 (2 pages).
International Preliminary Report on Patentability for Application No. PCT/GB2018/053526 dated Jun. 9, 2020 (12 pages).
Search Report issued by the United Kingdom Intellectual Property Office for Application No. 1720277.1 dated May 31, 2018 (4 pages).
International Search Report and Written Opinion for Application No. PCT/GB2018/053526 dated Jun. 3, 2019 (21 pages).

(56) References Cited

OTHER PUBLICATIONS

Search Report issued by the United Kingdom Intellectual Property Office for Application No. 1720277.1 dated Jun. 13, 2019 (3 pages).

* cited by examiner

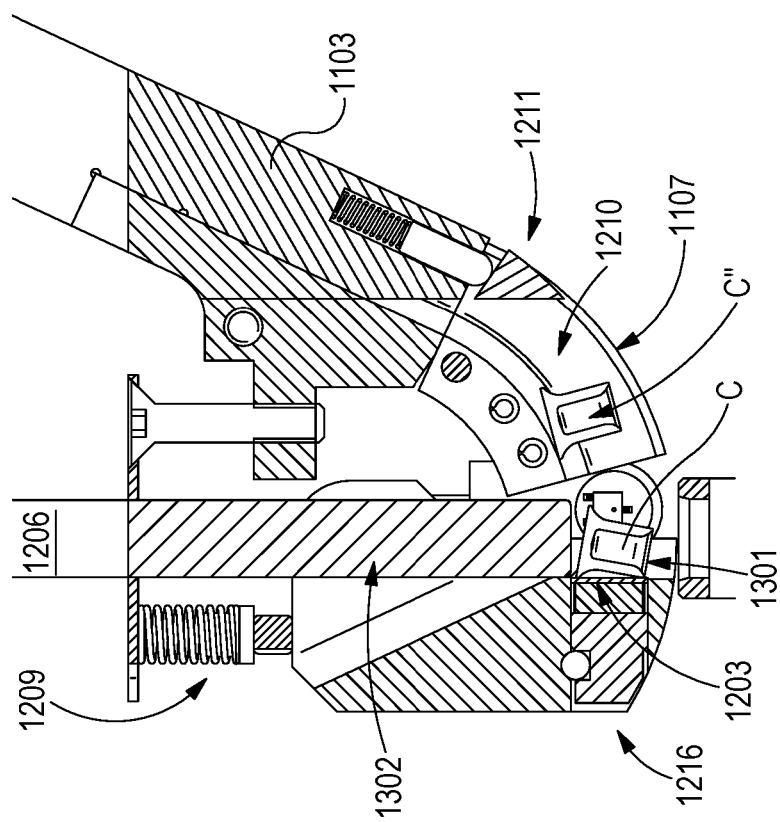
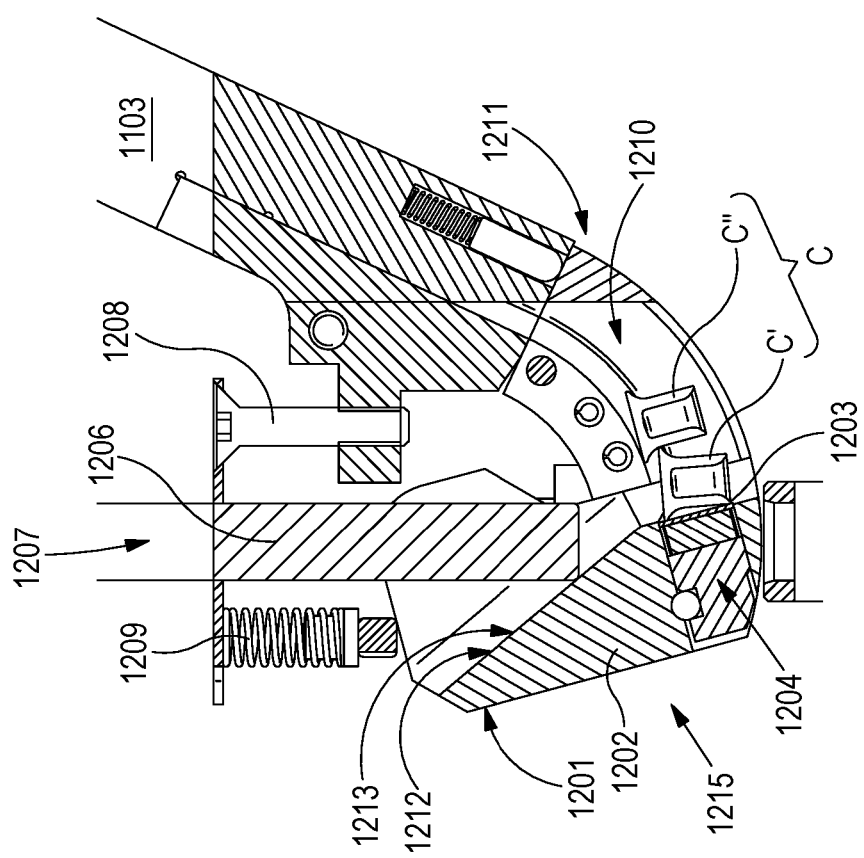
Fig. 13
Fig. 12

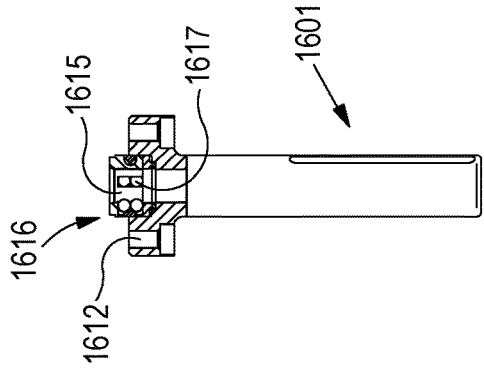
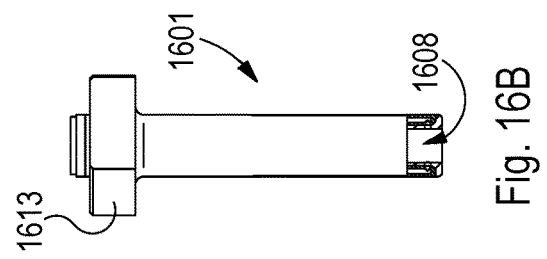
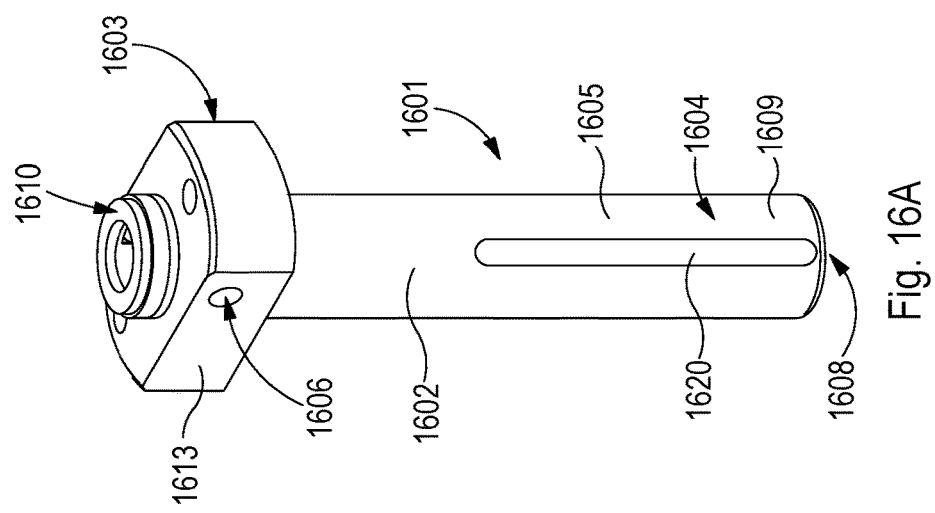
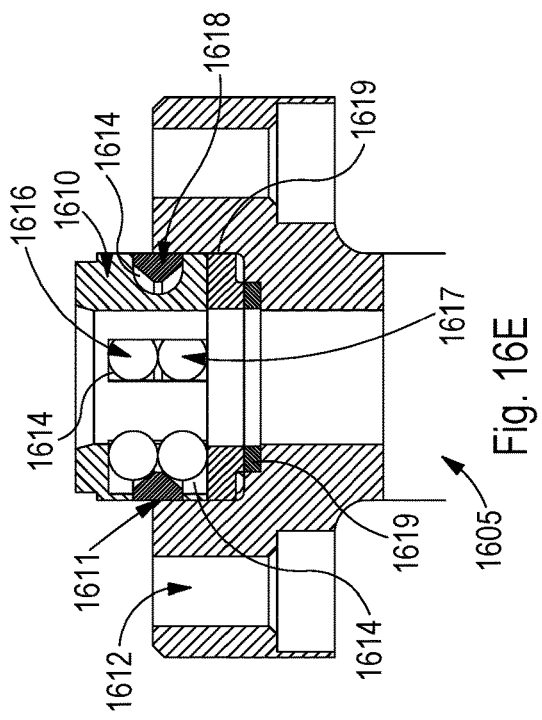
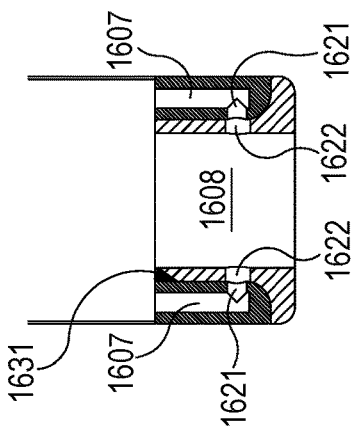

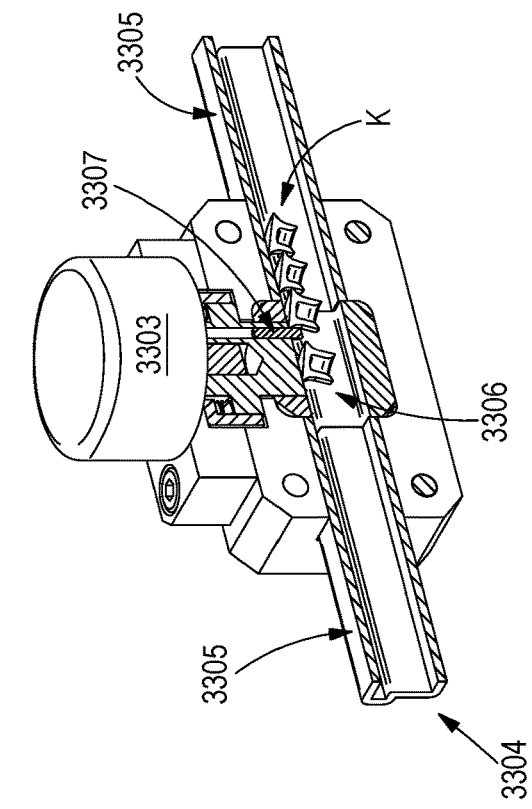
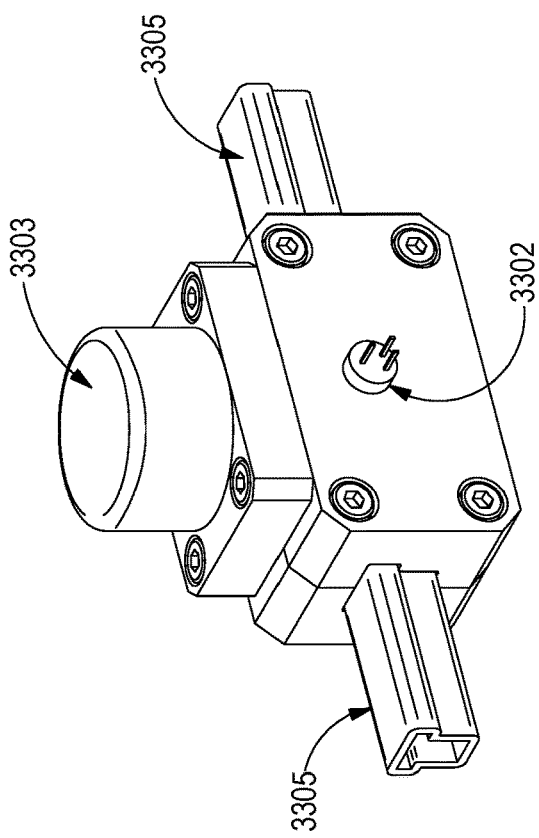
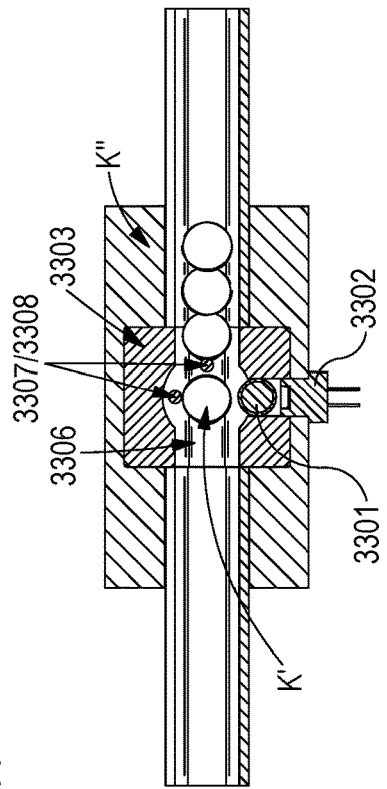
Fig. 33B
Fig. 33C
Fig. 33A

NOSE ARRANGEMENTS FOR FASTENER SETTING MACHINES, AND RELATED METHODS

CROSS REFERENCE TO RELATED APPLICATIONS

This application is a U.S. National phase application of International Application No. PCT/GB2018/053526 filed Dec. 5, 2018, which claims priority to Application No. GB 1720277.1 filed Dec. 5, 2017, the entire contents of both of which are incorporated by reference herein.

RELATED APPLICATIONS

This application is a U.S. National phase application of International Application No. PCT/GB2018/053526 filed Dec. 5, 2018, which claims priority to Application No. GB1720277.1 filed Dec. 5, 2017, the entire contents of both which are incorporated by reference herein.

TECHNICAL FIELD

The present application relates to nose arrangements for fastener setting machines. More particularly, the present application relates to nose arrangements including a transfer mechanism. The present application also relates to nose (or other) arrangements including one or more sensors. The present application also relates to nose assemblies for nose arrangements including at least one nosepiece. More particularly, the present application relates to rivet setting machines, and, yet more particularly, to self-piercing rivet setting machines. The present application also relates to self-piercing rivet setting machines of the kind comprising a setting tool having a nose arrangement as described herein, and a punch for setting the rivets. The setting tool, and thus the nose arrangement, is mounted on a support such as a C-frame, and the C-frame may be mounted on a robotic arm.

BACKGROUND

Various systems and methods for setting fasteners are known which use a bulk-supply apparatus to supply the fasteners to a setting tool. In some systems, the setting tool may comprise a nose arrangement and a punch for setting the fasteners. The setting tool may be mounted on a support structure such as a C-frame. The C-frame may be mounted on a robotic arm such that a large number of automatic operations per unit time may be accurately carried out by the robot at locations remote from the bulk-supply apparatus. The fasteners need to be delivered from the bulk-supply apparatus to the setting tool, and this is done via a fastener delivery or supply system.

The nose arrangement is generally disposed under the punch, and serves to receive the fasteners, and then to guide the fasteners and the punch during a setting operation. A die may be provided on the support structure, opposite the nose arrangement, to react the force applied by the setting tool to the workpiece during a setting operation. In this way, the workpiece is sandwiched between the nose arrangement and the die, and the punch is operated to set the fastener.

Systems of the type described herein typically feed the fasteners to the nose arrangement through suitably-profiled, flexible delivery tubes. The fasteners may be delivered through the use of compressed air and/or gravity. Further, the fasteners may be supplied singularly or in groups, and will generally thus also require the presence of some sort of fastener handling mechanisms along one or more of these fastener supply lines. These fastener handling mechanisms generally involve some form of management of the movement of the fasteners at some stage along their path to the setting tool. When the fasteners are received in the nose arrangement, at least one selected fastener stands in preparation for the setting operation, for example in a pair of conventional jaws located under the punch or in proximity thereof.

A transfer mechanism may be provided to transfer the fastener from a point of delivery in the nose arrangement (a fastener transfer area) to a position under the punch (a stand-by position), in readiness for the setting operation. Such a transfer mechanism may involve direct transfer by gravity, air propulsion and/or a number of mechanical parts such as a mechanical pusher, or a probe, that may trap the fastener.

It is thus desirable to improve the rapidity, efficiency and/or reliability of such transfer mechanisms, and/or of their components or related accessories.

The presence of a fastener in the nose arrangement is typically sensed by at least one sensor disposed in or about the nose arrangement to avoid blank setting operations.

It is thus also desirable to improve the sensing of any fasteners transiting in the nose arrangement.

During a setting operation initiated by the travel of the punch, the fastener may travel, carried by the punch, along and inside a generally tubular and elongated component generally known as the nosepiece. It is important that the fastener reaches the workpiece in the required position and orientation.

Accordingly, it is also desirable to provide an improved nosepiece.

More generally, the dynamic nature of the operations of fastener delivery and setting may be problematic in terms of fastener mobility and/or stability. For example, obstruction may be caused by the ingress of dust in the fastener delivery lines, or in the nose arrangement.

Further, these operations usually require a number of moving mechanical parts which may suffer wear and tear, or which adversely act on fastener coatings, or which could be adversely influenced by the presence of any adhesives used in the production environment. This may lead to faults or other sources of downtime.

Accordingly, there is a requirement to provide improved nose arrangements and fastener transfer mechanism over the prior art.

SUMMARY

According to an aspect of the present disclosure, there is provided a nose arrangement for a fastener setting tool having a punch for setting fasteners, the nose arrangement comprising:
  a support for supporting the nose arrangement on the setting tool, the support being adapted to receive the punch;
  a nosepiece for guiding the punch and a fastener during a fastener setting operation;
  the nose arrangement defining first and second fastener transfer areas situated laterally with respect to the punch, wherein the fasteners can wait to be transferred under the punch;
  a transfer mechanism for transferring the fasteners from the first and second fastener transfer areas under the punch, the transfer mechanism comprising a movable member that can be moved between first and second configurations;

wherein in the first of said configurations, the movable member is configured for holding a first fastener in a stand-by position under the punch, waiting for a fastener setting operation, and is configured for collecting a second fastener from the first fastener transfer area, and, wherein in the second of said configurations the movable member is configured for holding the second fastener in said stand-by position, and is configured for collecting a third fastener from the second fastener transfer area.

The first and second fastener transfer areas may be disposed, in use, on generally opposed sides with respect to the punch.

The movable member may be elongated and may have, in use, an extension in a substantially parallel direction with respect to the punch.

The movable member may be pivoted within the nose arrangement.

The movable member may be pivoted to said support.

The movable member may be generally configured as a pendulum.

The movable member may comprise a linear slider disposed in a guide located within the nose arrangement.

The linear slider may be disposed substantially perpendicular to the punch.

The movable member may comprise at least one magnetic face for holding and collecting the fasteners.

The magnetic face may be disposed on a side of the movable member.

The magnetic face may be conformed to the shape of a rivet, such as a self-piercing rivet.

The movable member may comprise two such magnetic faces, each for holding and collecting the fasteners.

The faces may be disposed on generally opposed sides of the movable member.

The movable member may comprise one or more permanent magnets, such as neodymium magnets, or surface printed correlated magnets.

The transfer mechanism may comprise an actuator for moving the movable member between the first and second configurations.

The actuator may be pneumatic.

The actuator may comprise a piston/cylinder arrangement.

A proximal end of the actuator may be connected to a pivotal and/or slidable attachment provided on said movable member.

A distal end of the actuator may be connected to said support.

The movable member may comprises back and front plates supporting a rivet carriage in between configured to receive the punch therethrough during a fastener setting operation.

The movable member may be configured such that it is actuated by the punch during a fastener setting operation.

The nose arrangement may further comprise limiting means for limiting the movement of the movable member between said first and second configurations.

The limiting means may comprise one or more stopper elements provided on or in the actuator.

The nose arrangement may further comprise at least one chute and/or a magazine for supplying the fasteners to the first and/or second fastener transfer areas.

A proximal end of said at least one chute and/or magazine may provide said limiting means.

Each chute and/or magazine may comprise an in-line escapement provided at said proximal end.

The in-line escapement may be provided on an outlet of said chute and/or magazine for holding the fasteners in the first and/or second fastener transfer areas.

The in-line escapement may be configured to be operated by the movable member to release a fastener when the movable member is in the first and/or the second configurations.

The in-line escapement may comprise one or more resiliently biased jaw members for retaining the fasteners before the fasteners are released.

Alternatively, the in-line escapement may comprise a portion of a fastener delivery track located in said chute and/or magazine.

The track portion may comprise at least one splitted-track arrangement.

The splitted-track arrangement may comprise a longitudinally splitted track segment pivotally arranged on said track portion.

The splitted track segment may be resiliently biased around said pivot so as to deform said fastener delivery track to trap one or more fasteners in said track portion.

Alternatively, the in-line escapement may comprise one or more sets of pins actuated by an external actuator for holding and releasing the fasteners.

The sets of pins may comprise a pin incorporating a magnetic element.

Said pin may be located downstream of any other pin.

The movable member may be adapted to form a sealed interface with the outlet of the magazine and/or chute when the movable member is in the first and/or second configurations.

The nose arrangement may comprise at least one vacuum port in fluid communication with said fastener delivery track.

The nose arrangement may comprise at least one compressed air exhaust port in fluid communication with said fastener delivery track.

The nose arrangement may further comprise at least one vacuum/exhaust connector coupled to said delivery track.

The vacuum/exhaust connector may be configured to contribute to said sealing interface together with said movable member.

The chute and/or the magazine may define a substantially undeformable fastener delivery track for delivering the fasteners; optionally wherein the magazine is a removable magazine.

According to an aspect of the present disclosure, there is provided a setting tool comprising the nose arrangement described herein The setting tool may be a rivet setting tool, and the fasteners may be rivets.

The setting tool may be a self-piercing rivet setting tool.

The fasteners may be self-piercing rivets.

According to an aspect of the present disclosure, there is provided a robotic arm comprising the setting tool described herein.

According to an aspect of the present disclosure, there is provided a method of preparing fasteners for a setting operation in a fastener setting tool having a punch for setting the fasteners, the method comprising:

providing a nose arrangement comprising:
   a support for supporting the nose arrangement on the setting tool, the support being adapted to receive the punch for setting the fasteners;

a nosepiece for guiding the punch and a fastener during a fastener setting operation;

the nose arrangement defining first and second fastener transfer areas situated laterally with respect to the punch, wherein the fasteners can wait to be transferred under the punch;

a transfer mechanism for transferring the fasteners from the first and second transfer areas under the punch, the transfer mechanism comprising a movable member that can be moved between first and second configurations;

moving the transfer mechanism in the first configuration, wherein in the first configuration the movable member is configured for holding a first fastener in a stand-by position under the punch waiting for a fastener setting operation, and for collecting a second fastener from the first fastener transfer area; and, moving the transfer mechanism in the second configuration, wherein in the second configuration the movable member is configured for holding the second fastener in said stand-by position, and for collecting a third fastener from the second fastener transfer area.

The method may further comprise alternately setting one fastener collected from the first fastener transfer area and one fastener collected from the second fastener transfer area, or vice versa.

The method may further comprise sequentially setting two fasteners collected from the first fastener transfer area or two fasteners collected from the second fastener transfer area.

According to an aspect of the present disclosure, there is provided a nose arrangement for a fastener setting tool having a punch for setting fasteners, the nose arrangement comprising:

a support for supporting the nose arrangement on the setting tool, the support being adapted to receive the punch;

a nosepiece for guiding the punch and a fastener during a fastener setting operation;

the nose arrangement defining a transfer area situated laterally with respect to the punch, wherein a fastener can wait to be transferred under the punch;

a transfer mechanism for transferring the fastener from the transfer area under the punch, the transfer mechanism comprising a movable member that can be moved between first and second configurations;

wherein the movable member comprises at least one pivot and a fastener carriage;

wherein the pivot is arranged to pivot the movable member within the nose arrangement;

wherein the fastener carriage is adapted to receive the punch therethrough during a fastener setting operation; and wherein the fastener carriage comprises a magnetic face on a side thereof arranged such that in the first of said configurations, the fastener carriage is adapted to magnetically collect a fastener from the fastener transfer area, and in the second of said configurations the fastener carriage is adapted to hold the fastener in a stand-by position under the punch waiting for a fastener setting operation.

The magnetic face may have a shape that conforms to that of a rivet, preferably a self-piercing rivet.

The movable member may have an extension generally parallel to that of the punch.

The movable member may be pivoted to said support.

The movable member may generally be configured as a pendulum.

The movable member may comprise an actuator attachment.

The actuator attachment may be in the shape of an elongated slot.

The fastener carriage may comprise a permanent magnet.

The fastener carriage may comprise a magnet protector disposed adjacent to said permanent magnet to protect the magnet from direct contact with the fastener.

The transfer mechanism may comprise an actuator for moving the movable member.

The actuator may be pneumatic.

The actuator may comprise a piston/cylinder arrangement.

A proximal end of said actuator may be connected to said pivotal attachment.

A distal end of said actuator may be connected to said support.

The movable member may be configured to be actuated by the punch during a setting operation.

The nose arrangement may further comprise limiting means for limiting the movement of the movable member.

The limiting means may limit the movement of the movable member between said first and second configurations.

The nose arrangement may further comprise at least one chute and/or a magazine for supplying fasteners to the fastener transfer area A proximal end of said at least one chute and/or magazine may provide said limiting means.

The chute and/or magazine may comprise an in-line escapement provided at an outlet thereof for holding the fasteners in the fastener transfer area.

The in-line escapement may be configured to be operated by the movable member to release a fastener when the movable member is in the first configuration.

The in-line escapement may comprise one or more resiliently biassed jaw members for retaining the fastener before the fastener is released Alternatively, the in-line escapement may comprise a portion of a fastener delivery track located in said chute and/or magazine.

The track portion may comprises at least one splitted-track arrangement as described herein.

The fastener carriage may be adapted to form a sealing interface with the outlet of the magazine and/or chute when the movable member is in the first configuration as described herein.

According to an aspect of the present disclosure, there is provided a method of preparing a fastener for a setting operation in a fastener setting machine tool having a punch for setting the fastener, the method comprising:

providing a nose arrangement comprising:

a support for supporting the nose arrangement on the setting tool, the support being adapted to receive the punch;

a nose assembly for guiding the punch and the fastener during a fastener setting operation;

the nose arrangement defining a fastener transfer area situated laterally with respect to the punch, wherein the fastener can wait to be transferred under the punch;

a transfer mechanism for transferring a fastener from the transfer area under the punch, the transfer mechanism comprising a movable member that can be moved between first and second configurations;

wherein the movable member comprises at least one pivot and a fastener carriage;

wherein the pivot is arranged to pivot the movable member within the nose arrangement;

wherein the fastener carriage is adapted to receive the punch therethrough during a fastener setting operation;

wherein the fastener carriage comprises a magnetic face disposed on a side thereof;

moving the transfer mechanism in the first configuration so that the fastener carriage collects a fastener from the fastener transfer area;

moving the transfer mechanism in the second configuration so that the fastener carriage holds the fastener in a stand-by position under the punch waiting for a fastener setting operation.

According to an aspect of the present disclosure, there is provided a nose assembly for a nose arrangement for a fastener setting tool having a punch for setting fasteners, the nose assembly being for guiding the punch and a fastener during a fastener setting operation and comprising:

a housing comprising a head and a tubular body for receiving the fastener and the punch during the setting operation, the tubular body extending longitudinally in an axial direction, the tubular body comprising a wall;

a fluid communication port located on said head, a fluid gallery extending longitudinally through said wall;

the fluid communication port being in fluid communication with the fluid gallery, and the fluid gallery being in fluid communication with the tubular body at a distal end thereof;

the nose assembly further including a fastener centralisation means for centralising a fastener in ingress into the nose assembly during a fastener setting operation, said fastener centralisation means being coupled to said head of the housing and said tubular body being in fastener-receiving communication with said fastener centralisation means.

The head may define a central recess.

The centralisation means may be received into said recess.

Optionally, the centralisation means is interference fitted to said recess.

Optionally, the head comprises one or more connection means for connecting the nose assembly to the nose arrangement;

Optionally, the connection means are in the form of one or more bores for receiving one or more respective bolts.

Optionally, the head comprises one or more lateral flat surfaces for registering the nose assembly in place within the nose arrangement.

The fastener centralisation means may be in the form of a tubular insert comprising one or more axially extending grooves for accommodating therein one or more centralising spheres.

The centralising spheres may be resiliently biased inwardly towards said axial direction so as to partially protrude within a passage defined by said tubular insert.

Optionally, the spheres may define one or more axially extending stacks.

Optionally, each stack may comprise two spheres.

Optionally, multiple stacks are equally angularly spaced around said axial direction.

Optionally, six spheres define three stacks of two spheres each, equally angularly spaced one from another of about 120 degrees.

Alternatively, the fastener centralisation means may comprise resiliently biased jaws or fingers disposed within said tubular insert.

The centralising spheres may be resiliently biased by a resiliently biasing medium accommodated within the tubular insert located outwardly with respect to said one or more spheres.

The biasing medium may protrude between at least two axially adjacent spheres arranged in a stack.

The resiliently biasing medium may be annular.

Optionally, the resiliently biasing medium is in the form of a ring.

Optionally, the ring has a generally polygonal cross section tapered inwardly towards said axial direction.

Optionally, the resiliently biasing medium is received on a recess located on an axially extending external surface of the tubular insert.

Optionally, the resiliently biasing medium is compressed between the spheres and a recess for receiving said tubular insert provided on an upper end of said head.

A resilient sealing member may be arranged axially between the insert and the tubular body sealing.

At least a portion of said fluid gallery may be provided within an axially extending wall insert, said wall insert being inserted into a corresponding axially extending recess provided externally on said wall of the tubular body.

The wall insert may extend to the distal end of said tubular body.

The wall insert may comprise a first transversally extending passageway in fluid communication with a second transversally extending passageway provided on said wall.

The head may comprise at least two fluid communication ports disposed on opposed sides of said head, and at least two respective fluid galleries in fluid communication with said at least two fluid communication ports, wherein the nose assembly may comprise a further axially extending wall insert inserted into a further corresponding axially extending recess also provided externally on said wall of the tubular body, generally opposite with respect to the other wall insert and recess.

According to an aspect of the present disclosure, there is provided a nose assembly for a nose arrangement for a fastener setting tool having a punch for setting fasteners, the nose assembly being for guiding the punch and a fastener during a fastener setting operation and comprising:

a housing comprising a head and a tubular body, the tubular body extending longitudinally in an axial direction;

a nosepiece for receiving the fastener and the punch during the setting operation, the nosepiece also having an axial extension in said axial direction and being received into said tubular body of the housing, the nosepiece incorporating one or more magnetic elements, said one or more magnetic elements comprising a distal magnetic element generally disposed at a distal end of the nosepiece.

A distance between a distal edge of said distal magnetic element and a distal edge of the tubular body of the housing configured for contacting, in use, a workpiece on which a fastener is to be installed, may be a predetermined distance.

Optionally, the distance is equal to the axial length of a rivet, preferably a self-piercing rivet.

The nosepiece may be configured as an insert that is interference fitted to the tubular body.

The nosepiece may extend for at least substantially the entire length of the tubular body.

The nosepiece may extend longitudinally further than the housing at a proximal end thereof thus defining a nosepiece insertion portion for insertion into the nose arrangement.

At least one magnetic element may extend further than the housing at its proximal end.

The head may comprise one or more connection means for connecting the nose assembly to the nose arrangement The connection means may be in the form of one or more bores for receiving one or more respective bolts.

The head may comprise one or more lateral flat surfaces for registering the nose assembly in place within the nose arrangement.

The one or more magnetic elements may extend axially in said axial direction.

The one or more magnetic elements may be provided in the form of magnetic bars and/or magnetic strips.

The magnetic bars or strips may comprise one or more respective magnetic element holders.

The magnetic elements may comprise one or more permanent magnets, each of which may optionally be disposed in a separate magnetic element holder.

The one or more magnetic elements may each be received in a respective recess provided on a longitudinally extending external surface of the nosepiece.

The nose assembly may comprise at least two magnetic elements.

The at least two magnetic elements may be disposed at different angular locations around the nosepiece.

The least two magnetic elements may be adjacent one to another.

The at least two magnetic elements may overlap at least partially with reference to said axial direction.

The at least two magnetic elements may axially substantially uninterruptedly extend for the length of an axial portion of the nosepiece extending to and including said distal magnet.

The nose assembly may further comprise a fastener centralisation means for centralising a fastener.

The fastener centralisation means may be located at a distal end of the nose assembly for centralising a fastener in egress from the nose assembly during a fastener setting operation.

The fastener centralisation means may be located at the distal of the nosepiece.

The fastener centralisation means may comprise a tubular body portion disposed in fastener-receiving communication with said nosepiece.

The tubular body portion may be integrally formed with the nosepiece.

The nosepiece and the tubular body portion may be formed as a single piece.

The tubular body portion may comprise one or more axially extending grooves for accommodating therein one or more centralising spheres resiliently biassed inwardly towards said axial direction so as to partially protrude within a passage defined by said tubular body portion as described herein.

A subset of said magnetic elements may be arranged in axial spaced relationship along the nosepiece.

Optionally, said subset of magnetic elements are arranged at equal axial intervals.

Optionally, said subset of magnetic elements are annular.

Optionally, said subset of magnetic elements are each in the form of a ring.

Optionally, said subset of magnetic elements each comprise two half-rings.

Optionally, each magnet is accommodated within a corresponding sleeve.

Optionally, each sleeve is formed on an axially extending inner surface of the nosepiece, or is part of a separate component for insertion into the nosepiece.

Optionally, said subset of magnetic elements are axially arranged according to alternate polarities.

Optionally, said subset of magnetic elements are correlated magnets.

According to an aspect of the present disclosure, there is provided a fastener sensing arrangement comprising:

a fastener supply line for supplying fasteners to a setting tool;

a fastener handling device and/or a fastener setting device;

at least one magnetic element; and, a Hall effect sensor for sensing a fastener, handled by said fastener handling device and/or set by said fastener setting device, in cooperation with said magnetic element.

The fastener handling device may comprises an in-line rivet selection device for stopping, trapping and/or releasing one or more fasteners on the fastener supply line, and the magnetic element is disposed in proximity of the in-line rivet selection device.

The in-line rivet selection device may comprise a rotary cam escapement.

The magnetic element may be disposed laterally with respect to a rotary cam of said rivet selection device.

The in-line rivet selection device may comprise a linear pin escapement comprising one or more pins.

The magnetic element may be incorporated into one of said pins.

Alternatively, the magnetic element may be disposed laterally with respect to said pins.

The arrangement may further comprise: a nose arrangement for a fastener setting tool having a punch for setting the fasteners as the fastener setting device, the nose arrangement being in fastener-receiving communication with said fastener supply line, the nose arrangement comprising:

a support for supporting the nose arrangement on the setting tool, the support being adapted to receive the punch;

a nose assembly for guiding the punch and a fastener during a fastener setting operation;

the nose arrangement defining at least one fastener transfer area situated laterally with respect to the punch, wherein a fastener received from said supply line can wait to be transferred to a stand-by position under the punch;

the nose arrangement also comprising said fastener handling device in the form of a transfer means for transferring a fastener from the fastener transfer area to the stand-by position, said transfer means comprising said magnetic element; and, the nose arrangement also comprising said Hall effect sensor for sensing a fastener received in said nose arrangement.

The support may be made of a non-ferromagnetic material.

The transfer means may be made of a non-ferromagnetic material.

The support may generally be in the shape of an enclosure.

The Hall effect sensor may be disposed within said enclosure.

The magnetic element may comprise a permanent magnet, optionally wherein the permanent magnet comprises a neodymium magnet or surface printed correlated magnet.

The transfer means may comprise a transfer mechanism for transferring the fastener from the transfer area under the punch, the transfer mechanism comprising a movable member adapted to receive the punch therethrough during a fastener setting operation and that can be moved between first and second configurations, said magnetic element being disposed on or within said movable member.

The movable member may comprise a magnetic face on a side thereof arranged such that in the first of said configurations, the movable member is adapted to magnetically collect a fastener from the fastener transfer area, and in the second of said configurations the movable member is adapted to hold the fastener in a stand-by position under the punch waiting for a fastener setting operation.

When the movable member is arranged in said second configuration, said magnetic element may be arranged generally parallel with respect to the punch.

Said magnetic element may comprise a bar having a generally rectangular cross-section.

The opposed polarities of the magnetic element may be defined either side of a centre plane passing through the magnetic element, also generally parallel to the punch.

The Hall effect sensor may be arranged in proximity of the stand-by position for detecting a fastener presence in the stand-by position.

The Hall effect sensor may be arranged rearwardly with respect to the transfer means and/or said moveable member.

A line of sight may be defined between the Hall effect sensor and a fastener held by the transfer means and/or said movable member in the stand-by position.

The Hall effect sensor may be arranged in offset relationship with respect to a notional direction defined by a line passing through a centre of the magnetic element and a centre of said fastener held in the stand-by position.

A distance measured between a fastener-facing side of the magnetic element and a centre of the Hall effect sensor may be between 4 and 7 mm when projected on said notional direction.

Said distance may preferably be between 4.5 and 6.5 mm.

The Hall effect sensor may be arranged in proximity of the fastener transfer area for detecting a fastener presence in the fastener transfer area.

The Hall effect sensor may be arranged to detect the fastener presence in the fastener transfer area when said movable member is in said first configuration.

The transfer means may comprise an in-line rivet selection device generally disposed at the fastener transfer area.

The in-line rivet selection device may incorporate said magnetic element.

The in-line rivet selection device may comprise a rotary cam escapement.

The magnet may be disposed in proximity of a rotary cam of said rotary cam escapement.

The in-line rivet selection device may comprise a set of one or more pins for stopping, trapping and/or releasing a fastener to the stand-by position, said magnetic element being incorporated into at least one of said pins.

The pins may extend longitudinally in the direction of the punch.

The magnetic element may generally be in the shape of a magnetic strip or bar and is adapted to be longitudinally inserted or otherwise incorporated into one of said pins.

The magnetic element may be incorporated into a lead pin located closer to the punch than any other pins.

The magnetic element may be generally disposed on a side of the lead pin, towards the fastener transfer area.

The lead pin may comprise a further magnetic element.

The further magnetic element may be disposed on an opposite side of the lead pin, towards the punch, for interacting with, preferably for attracting, a fastener located at the stand-by position.

Optionally, the lead pin is disposed adjacent to the punch;

Optionally, the lead pin is disposed next to the punch.

The nose arrangement may comprise one further such in-line rivet selection device disposed in generally mirrored configuration with respect to the punch.

According to an aspect of the present disclosure, there is provided a method of detecting a fastener, the method comprising:

providing a fastener sensing arrangement as described herein; and, monitoring a signal provided by the Hall effect sensor.

Optionally, the method comprises comparing said signal with a reference to detect the fastener. Further analysis steps may also advantageously be provided for, for example not only for detecting but also for discerning a type and/or size of rivet.

According to an aspect of the present disclosure, there is provided a method of detecting a retracted position of a punch of a fastener setting tool, the method comprising:

providing a nose arrangement as described herein; and, monitoring a signal provided by the Hall effect sensor.

Optionally, the method comprises comparing said signal with a reference to detect passage of the punch through the stand-by position during a fastener setting operation.

The method may further comprise:

activating the transfer means to collect a fastener from the fastener transfer area when the punch is detected in the retracted position.

According to an aspect of the present disclosure, there is provided a method of detecting a fastener in a fastener transfer area within a nose arrangement, the method comprising:

providing a nose arrangement as described herein;

monitoring a signal provided by the Hall effect sensor.

The method may further comprise comparing said signal with a reference to detect the fastener.

According to an aspect of the present disclosure, there is provided a method of setting a fastener comprising driving a fastener with a punch in a nose assembly as described herein.

According to an aspect of the present disclosure, there is provided an in-line fastener escapement for selectively releasing a fastener onto a fastener delivery track, the in-line fastener escapement comprising:

a splitted-track portion of said fastener delivery track, said splitted-track portion comprising a longitudinally splitted track segment pivotally arranged on said splitted-track portion, wherein said splitted track segment is rotatable around said pivot so as to deform said fastener delivery track to trap one or more fasteners and is counter-rotatable around said pivot to remove said deformation and thus release said fastener thereon.

The fastener delivery track may be cross-sectionally generally T-shaped to accommodate one or more rivets.

Optionally, said one or more rivets may be self-piercing rivets.

The splitted track segment may comprise about one longitudinal half of said splitted-track portion of the fastener delivery track.

The escapement may further comprise resiliently biasing means for biasing said splitted track segment to trap said one or more fasteners.

Optionally, said resiliently biased means comprise a compression spring.

According to an aspect of the present disclosure, there is provided a chute for delivering fasteners to a setting tool, said chute comprising an in-line fastener escapement as described herein.

The escapement may be generally located at a downstream or proximal end of the chute.

According to an aspect of the present disclosure, there is provided a nose arrangement for a fastener setting tool having a punch for setting fasteners, the nose arrangement comprising:
a chute as described herein.

Optionally, said chute is connected to, or is part of, a fastener magazine, which may be a removable magazine.

The nose arrangement may further comprise a support for supporting the nose arrangement on the setting tool, the support being adapted to receive the punch;
the escapement defining, where a fastener is trapped, a fastener transfer area for the fastener to wait in the nose arrangement to be transferred under the punch;
a transfer mechanism for transferring the fastener from the transfer area under the punch, the transfer mechanism comprising a movable member that can be moved between first and second configurations, the movable member being adapted to receive the punch therethrough during a fastener setting operation;
the movable member being arranged such that:
in the first of said configurations, the movable member pivotally operates the escapement to release a fastener from the fastener transfer area, and
in the second of said configurations, the movable member holds the fastener in a stand-by position under the punch waiting for a fastener setting operation.

The nose arrangement may further comprise a nosepiece for guiding the punch and the fastener during a fastener setting operation.

The nose arrangement may comprise two such chutes in mirror configuration on either side of the punch.

The movable member may be movable to a third configuration to operate the opposed escapement and collect a fastener therefrom.

According to an aspect of the present disclosure, there is provided a method of setting a fastener comprising operating the in-line escapement as described herein.

According to an aspect of the present disclosure, there is provided a method of manufacturing a vehicle or a part thereof by setting one or more fasteners thereon, wherein the method incorporates any of the procedures described herein.

The invention will now be described purely by way of example with reference to the following drawings in which:

DRAWINGS

Figure 6:
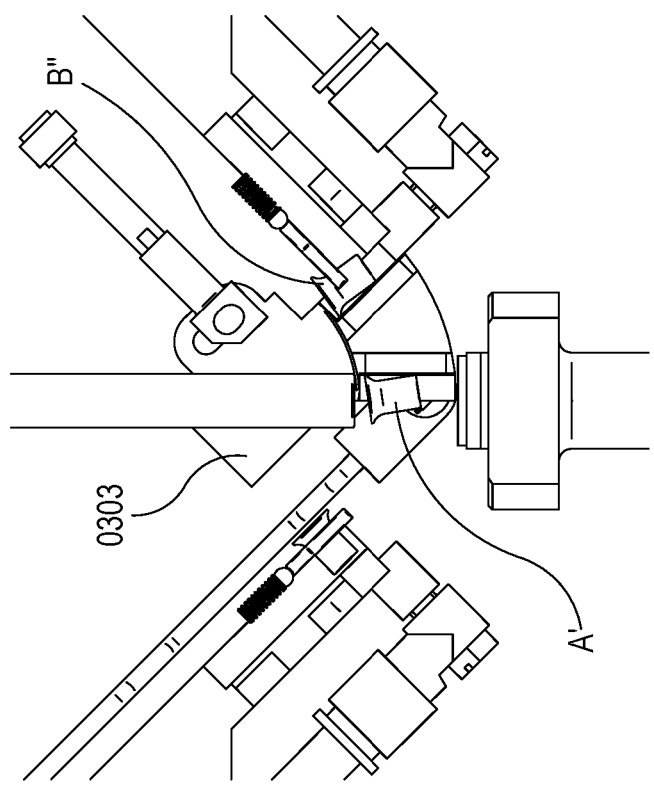
FIG. 6 is a front plan view similar to that of FIGS. 3, 4 and 5, with the movable member in the first configuration collecting a rivet on the right-hand side.
Figure 7A:
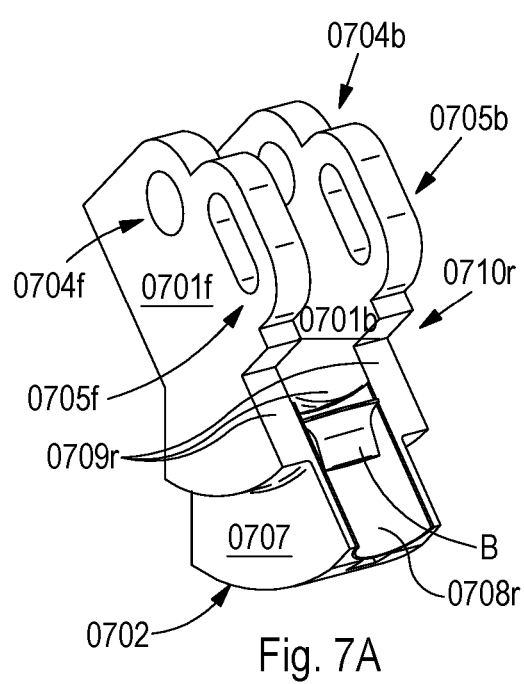
Figure 7B:
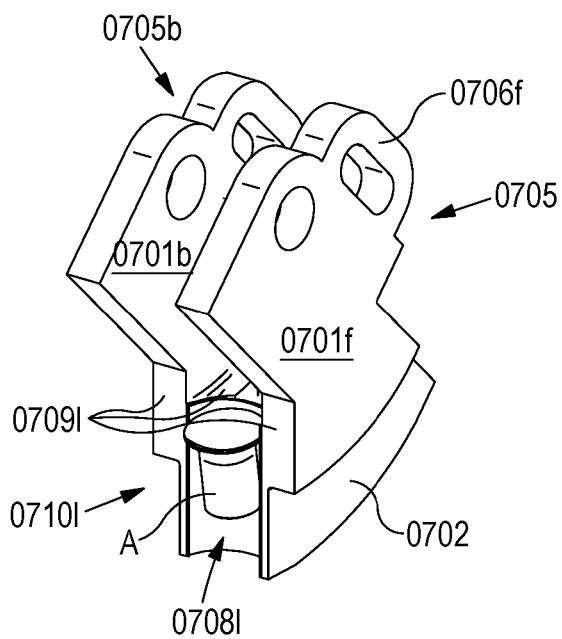
Figure 8:
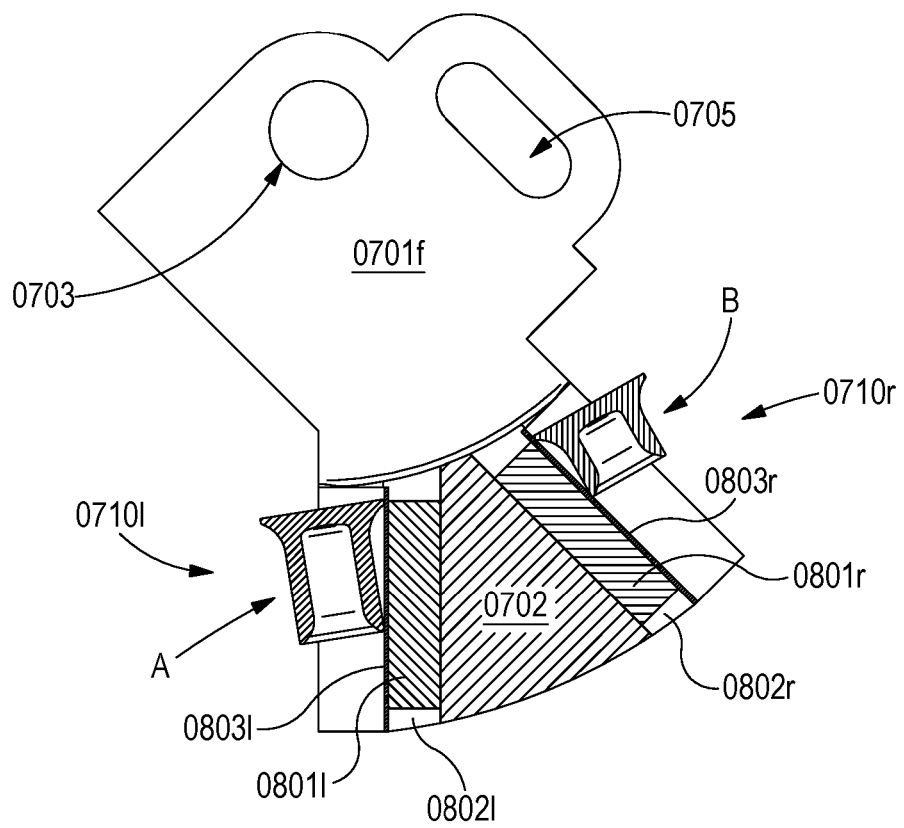
Figure 9A:
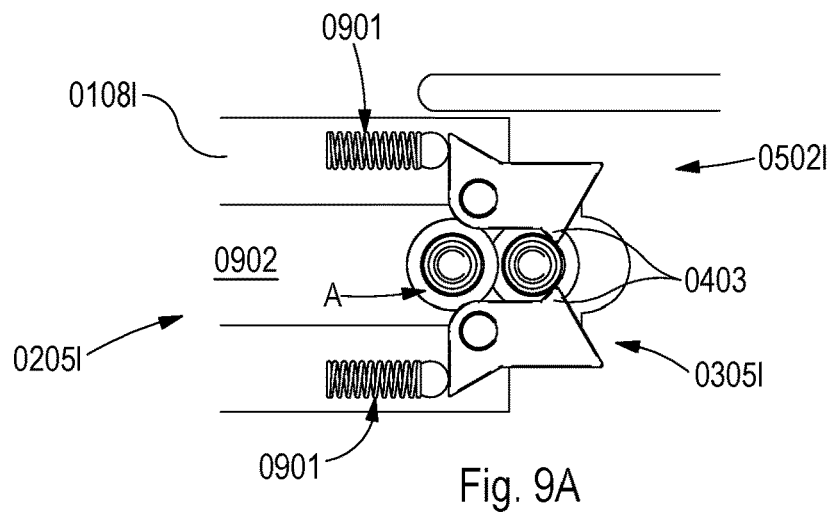
Figure 9B:
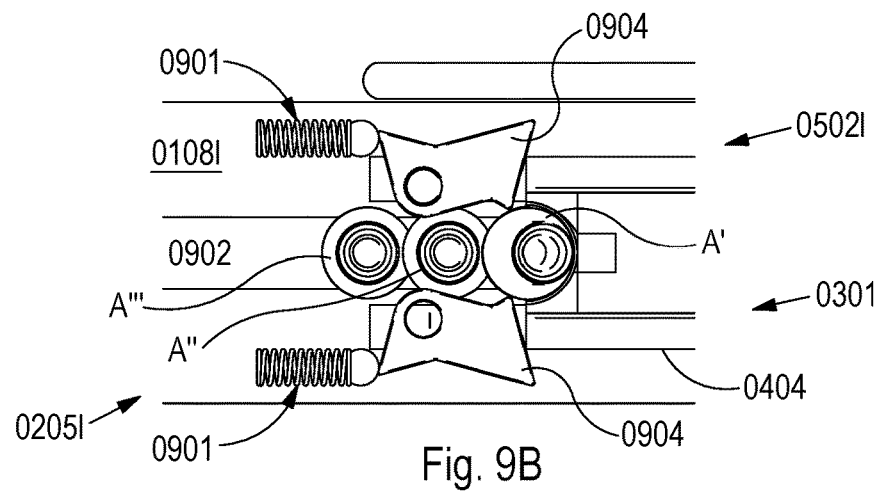
Figure 9C:
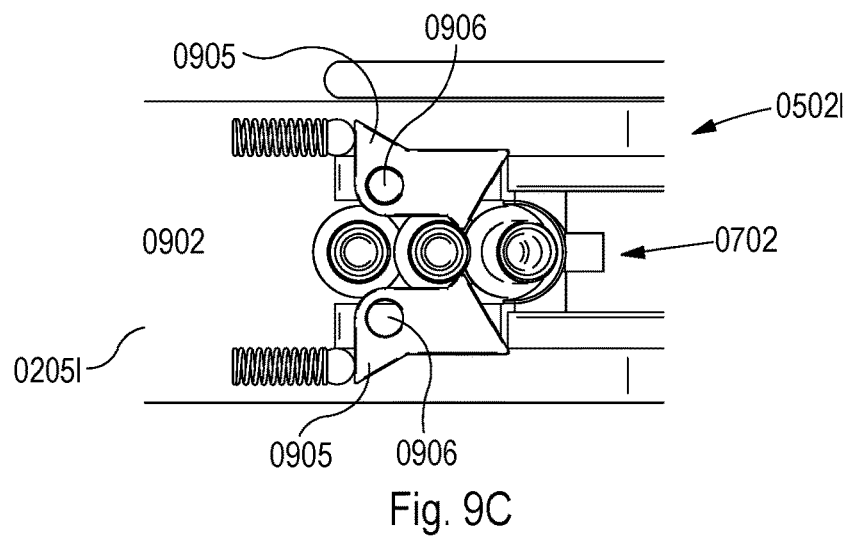
Figure 10:
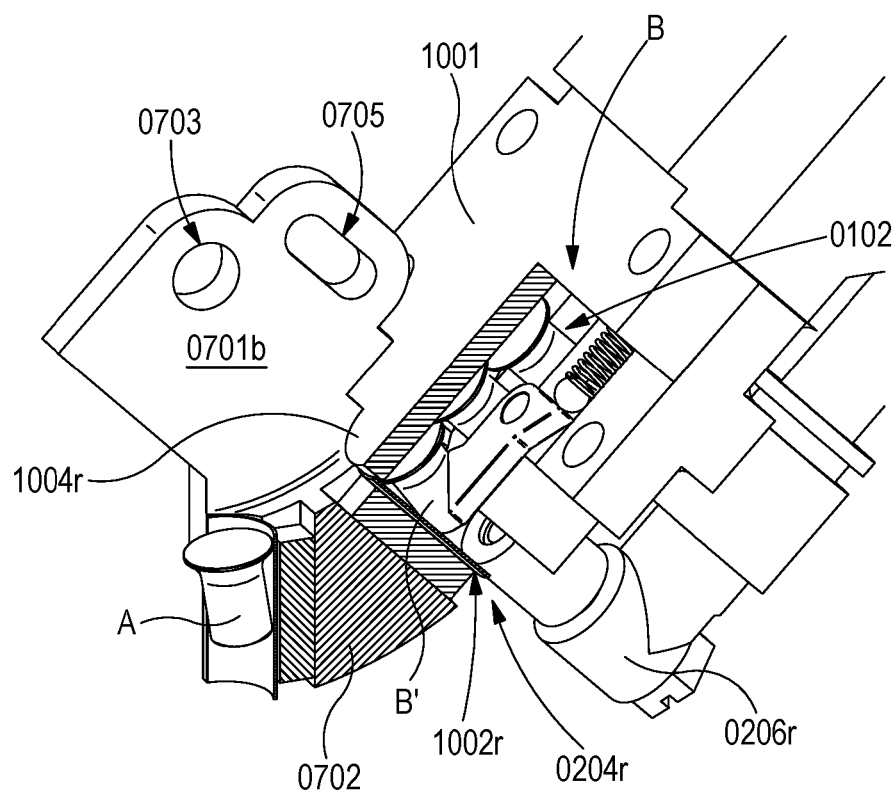
Figure 11A:
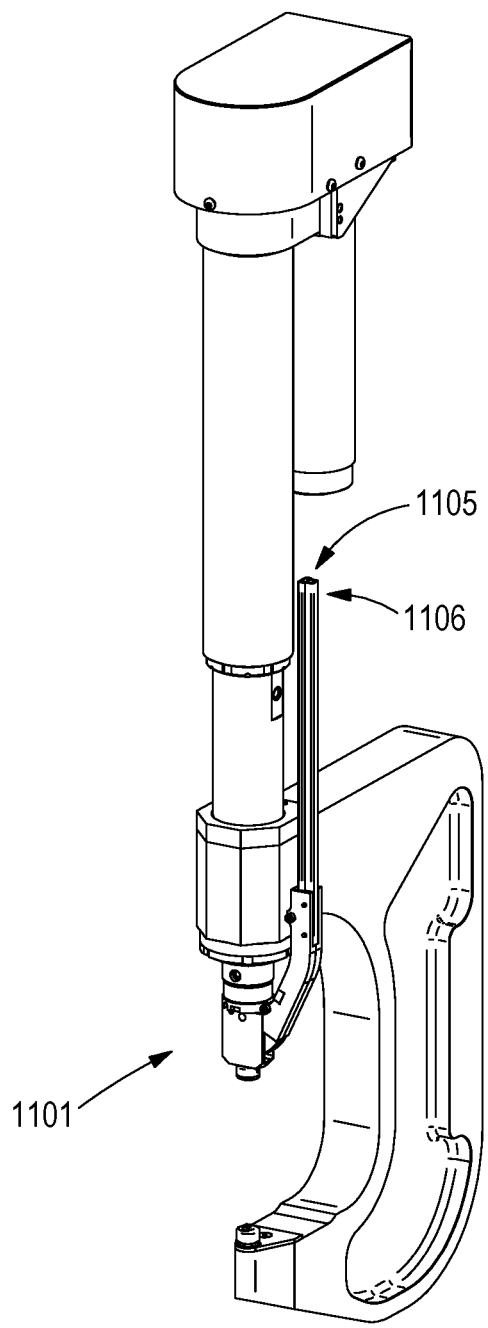
Figure 11B:
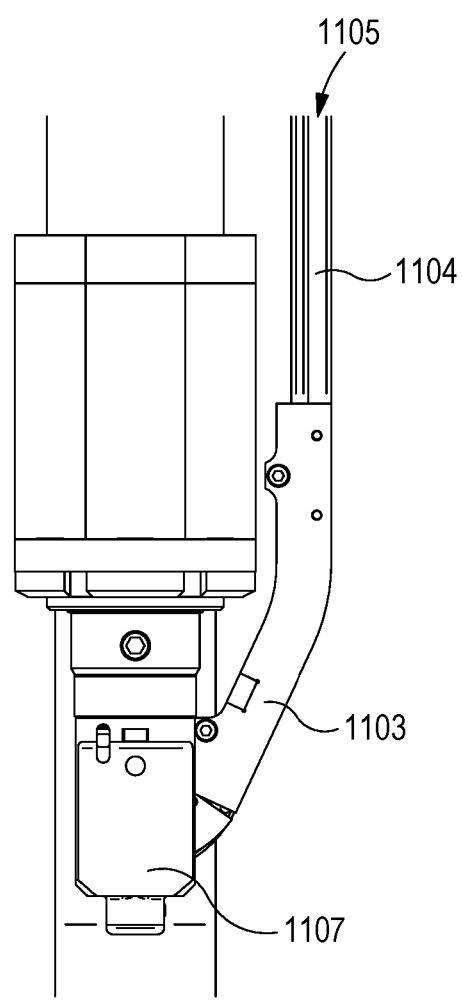
Figure 15:
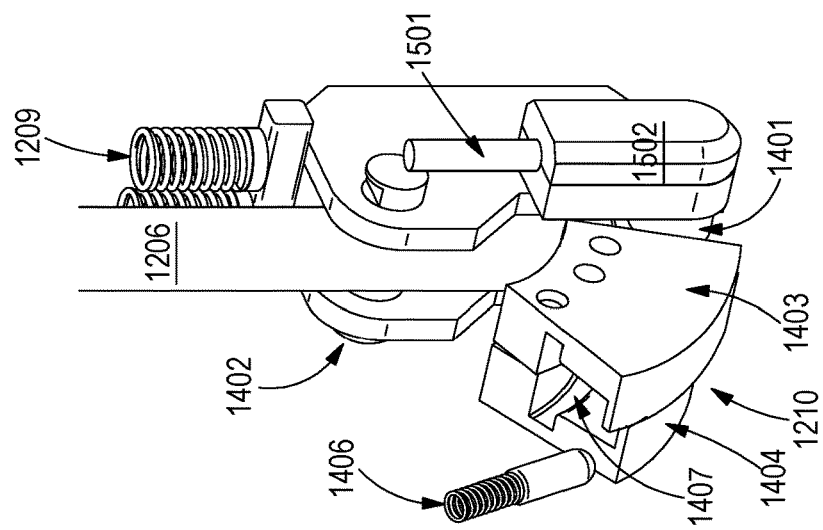
Figure 14B:
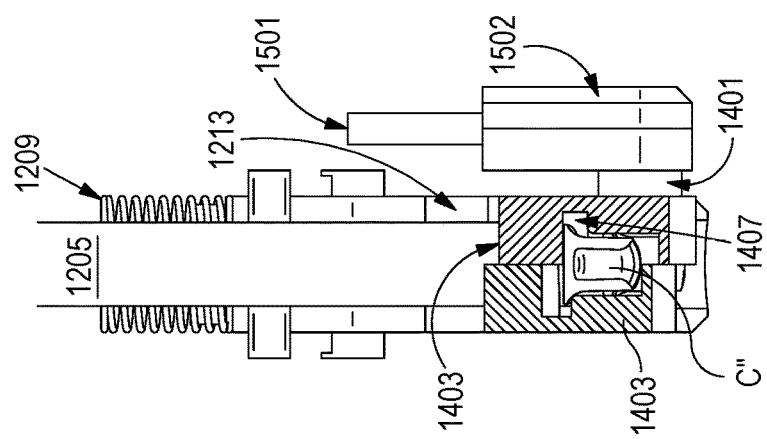
Figure 14A:
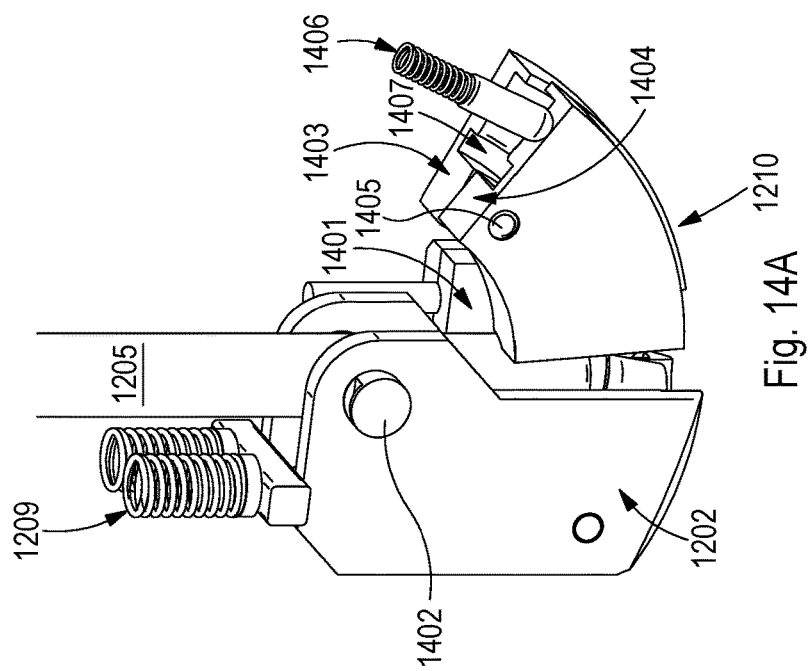
Figure 18B:
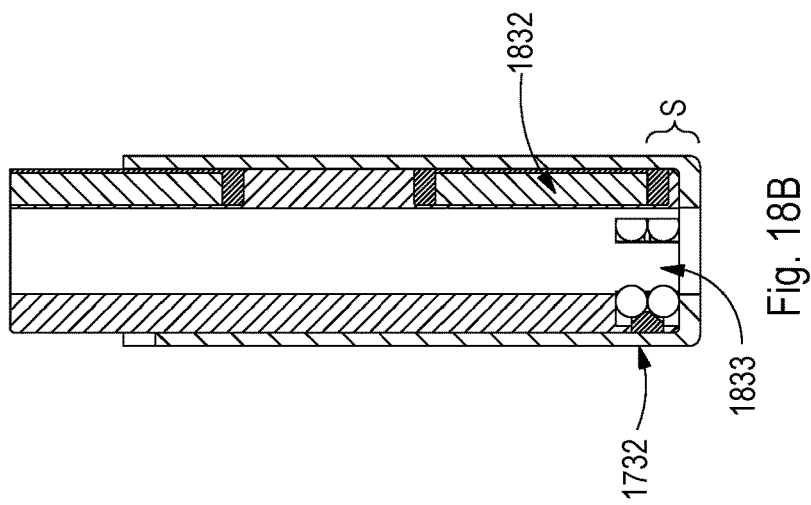
Figure 18A:
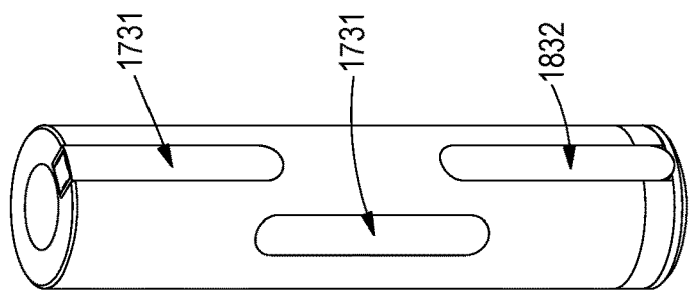
Figure 17:
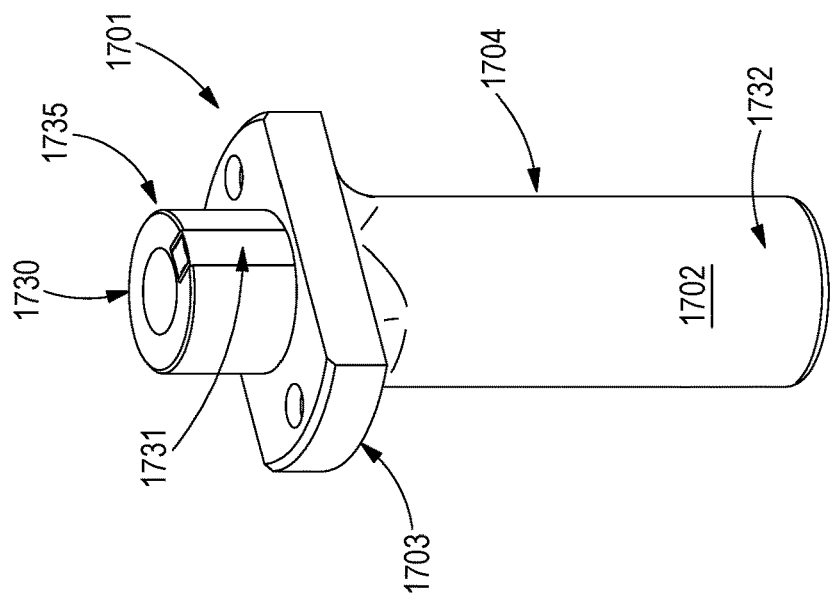
Figure 20B:
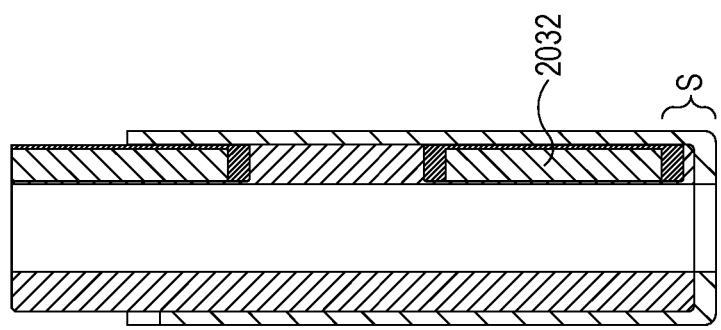
Figure 20A:
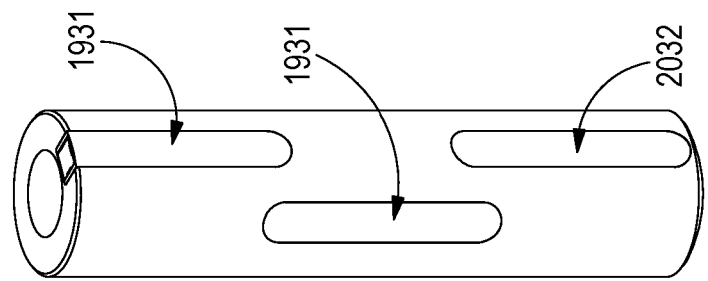
Figure 19:
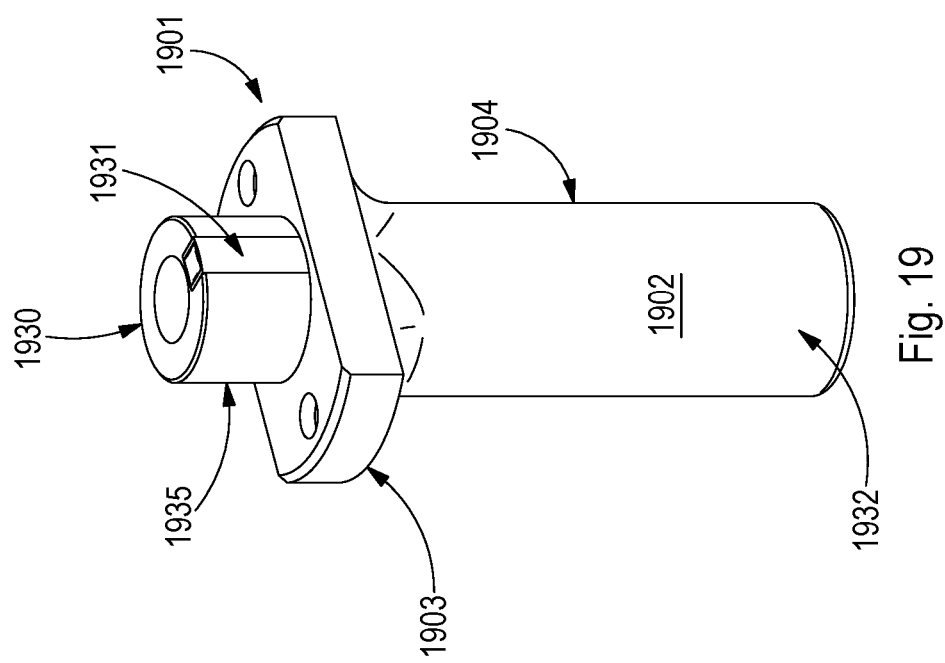
Figure 22B:
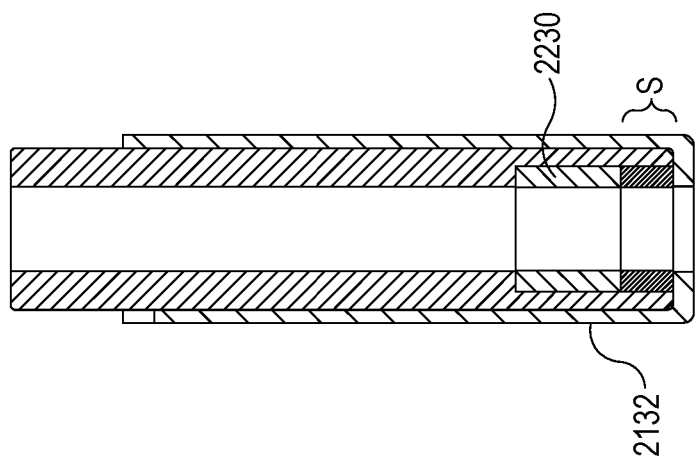
Figure 22A:
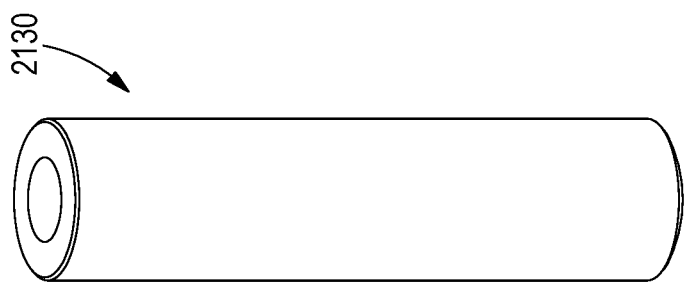
Figure 21:
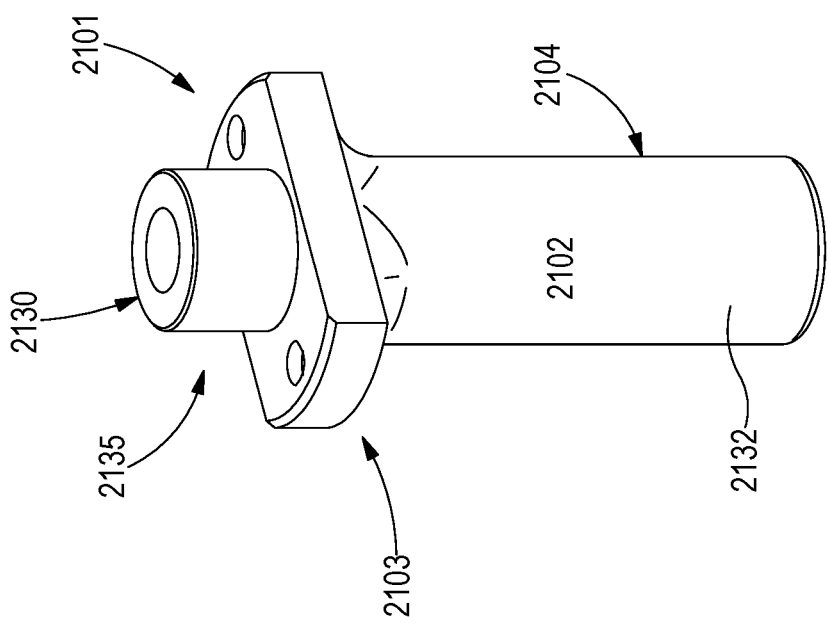
Figure 24A:
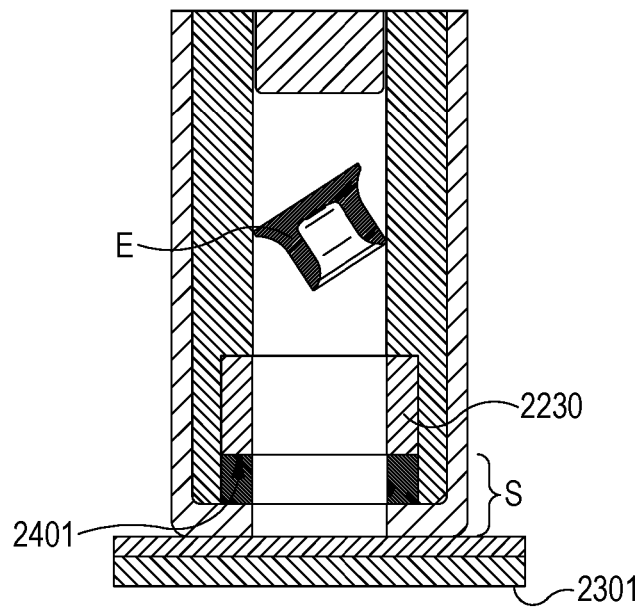
Figure 24B:
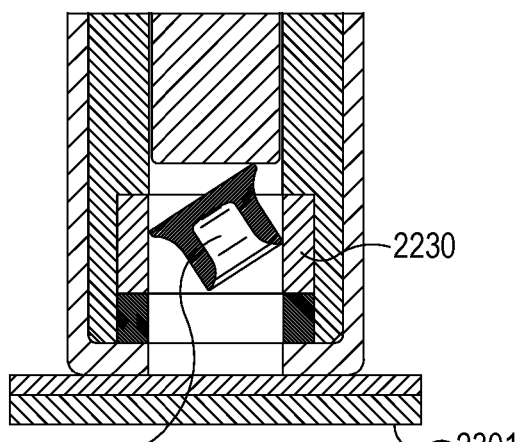
Figure 24C:
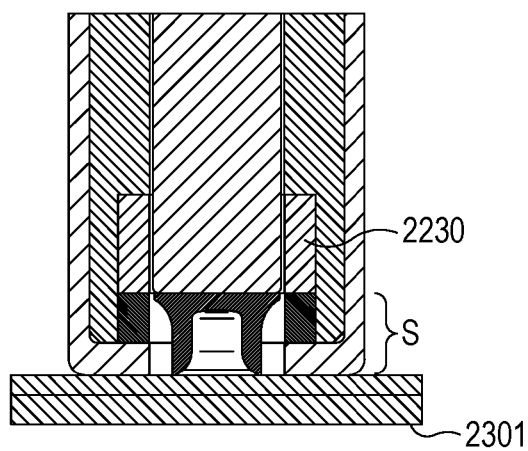
Figure 25A:
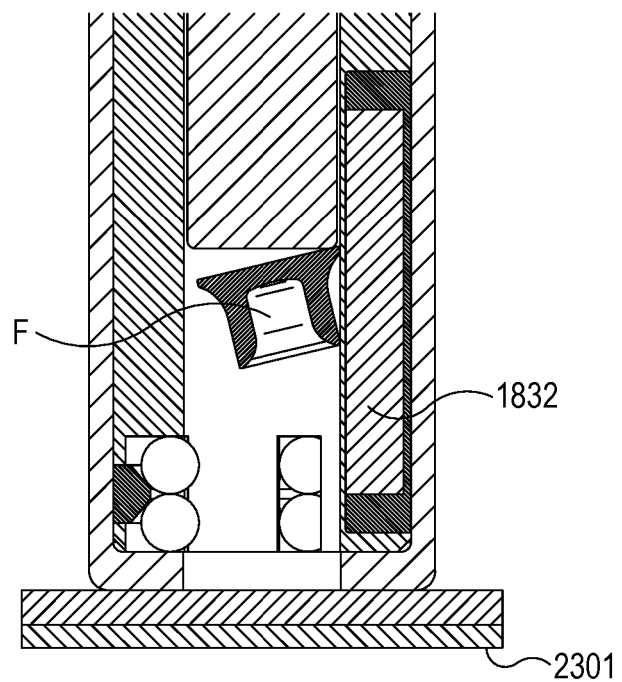
Figure 25B:
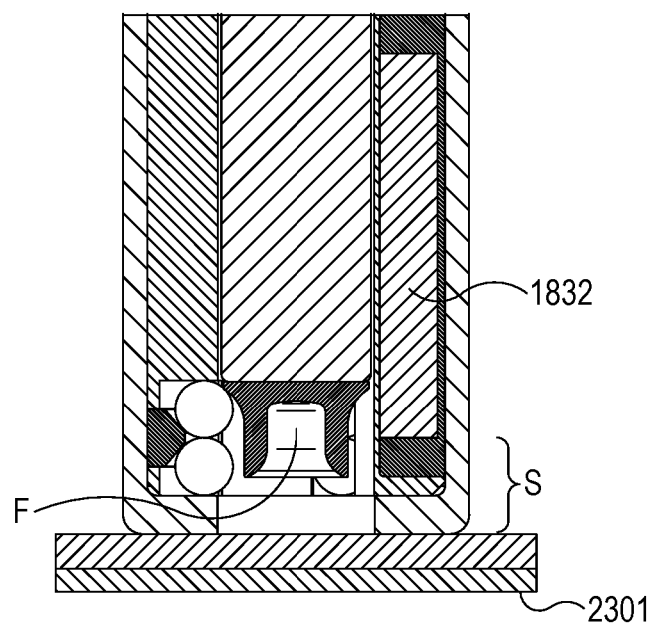
Figure 26A:
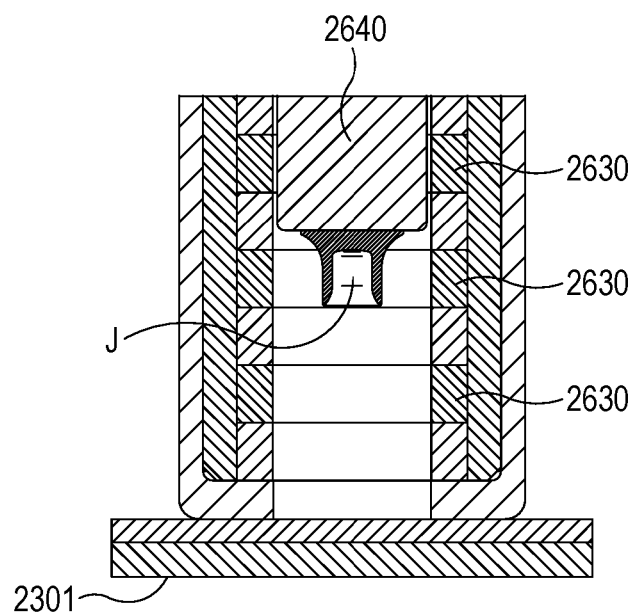
Figure 26B:
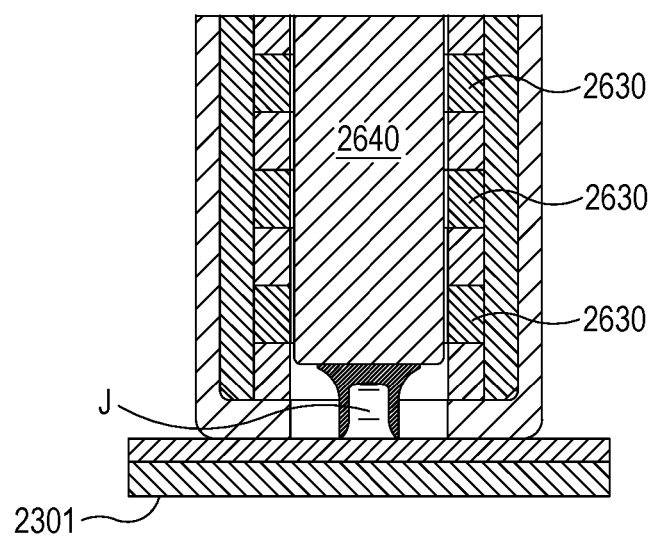
Figure 27A:
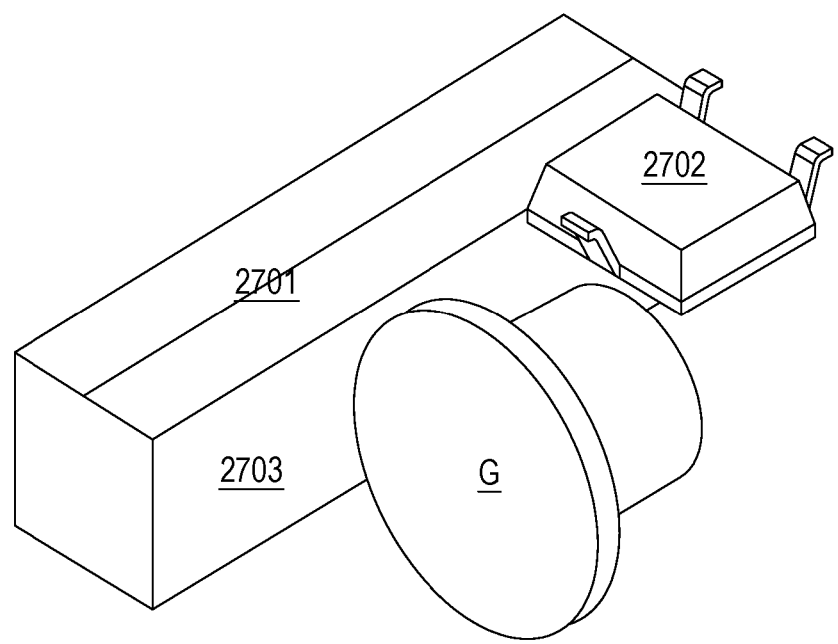
Figure 27B:
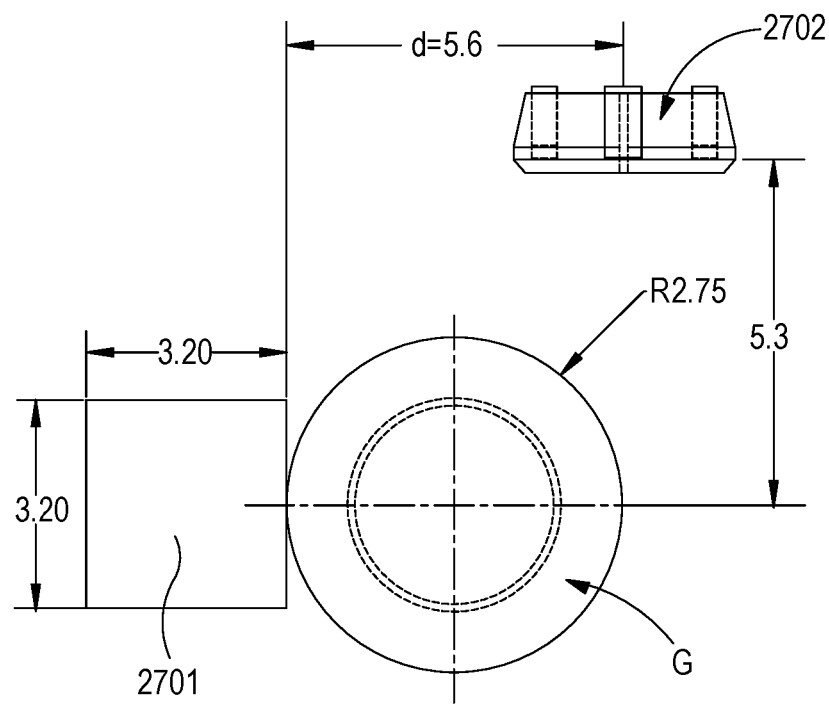
Figure 29:
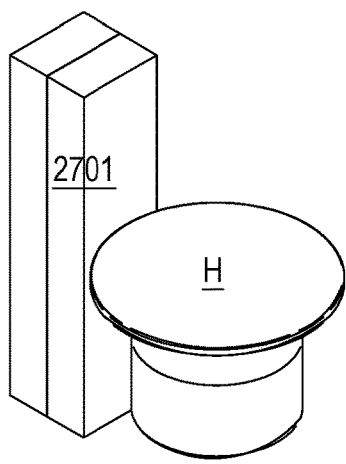
Figure 28:
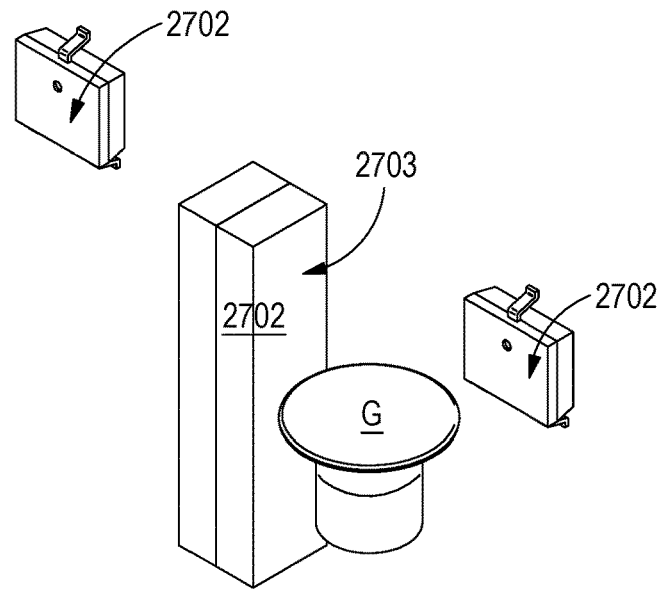
Figure 30:
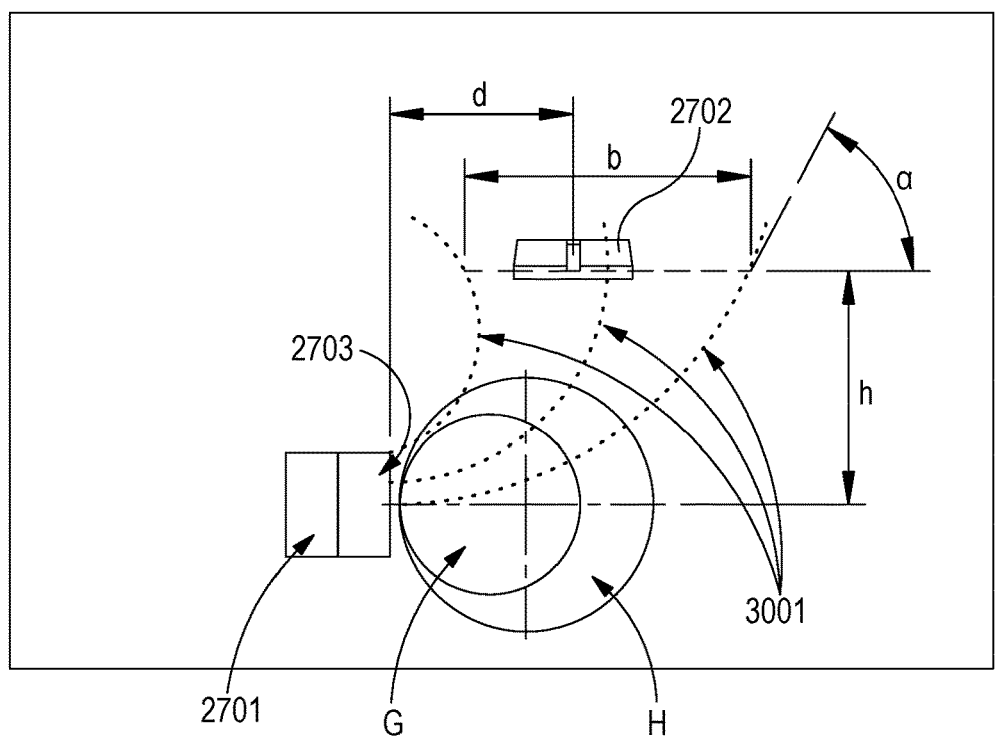
Figure 31:
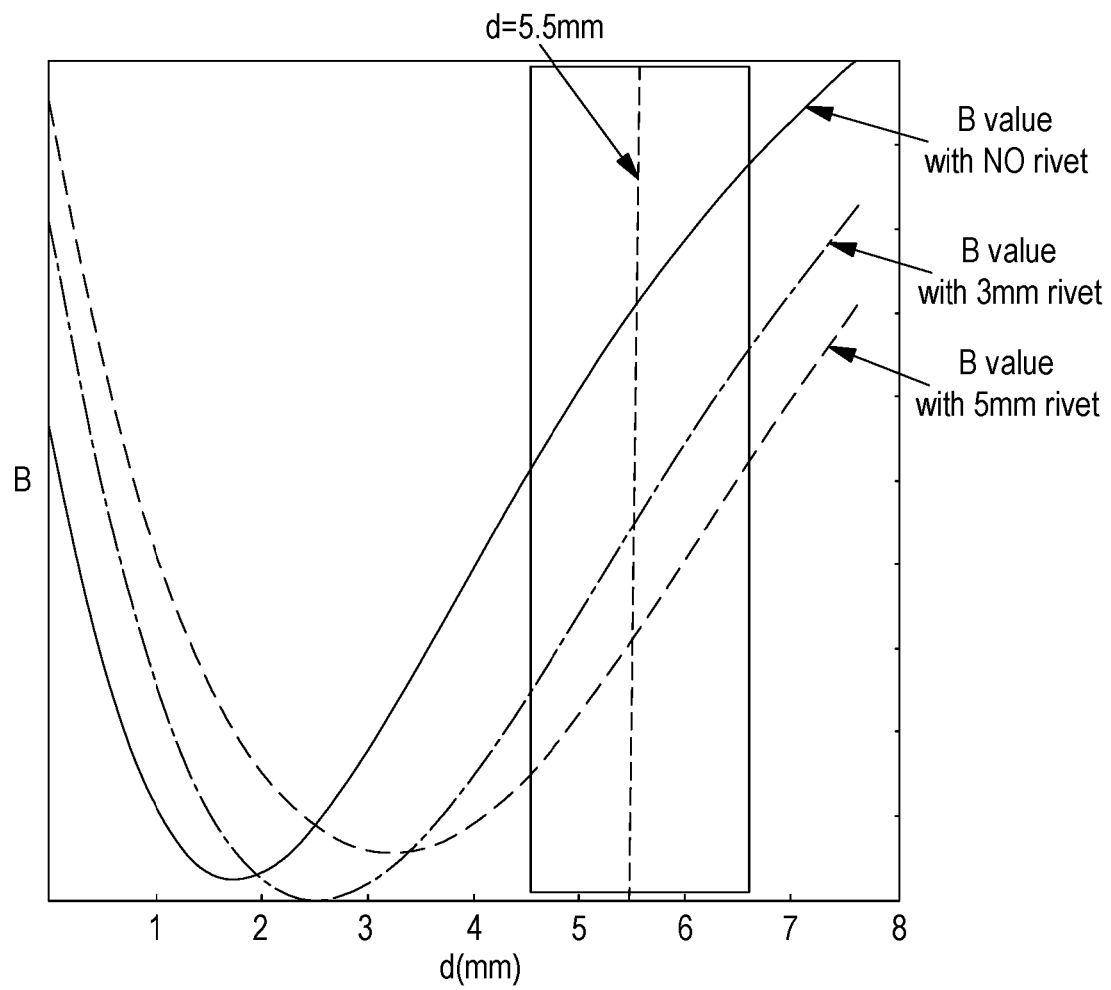
Figure 32:
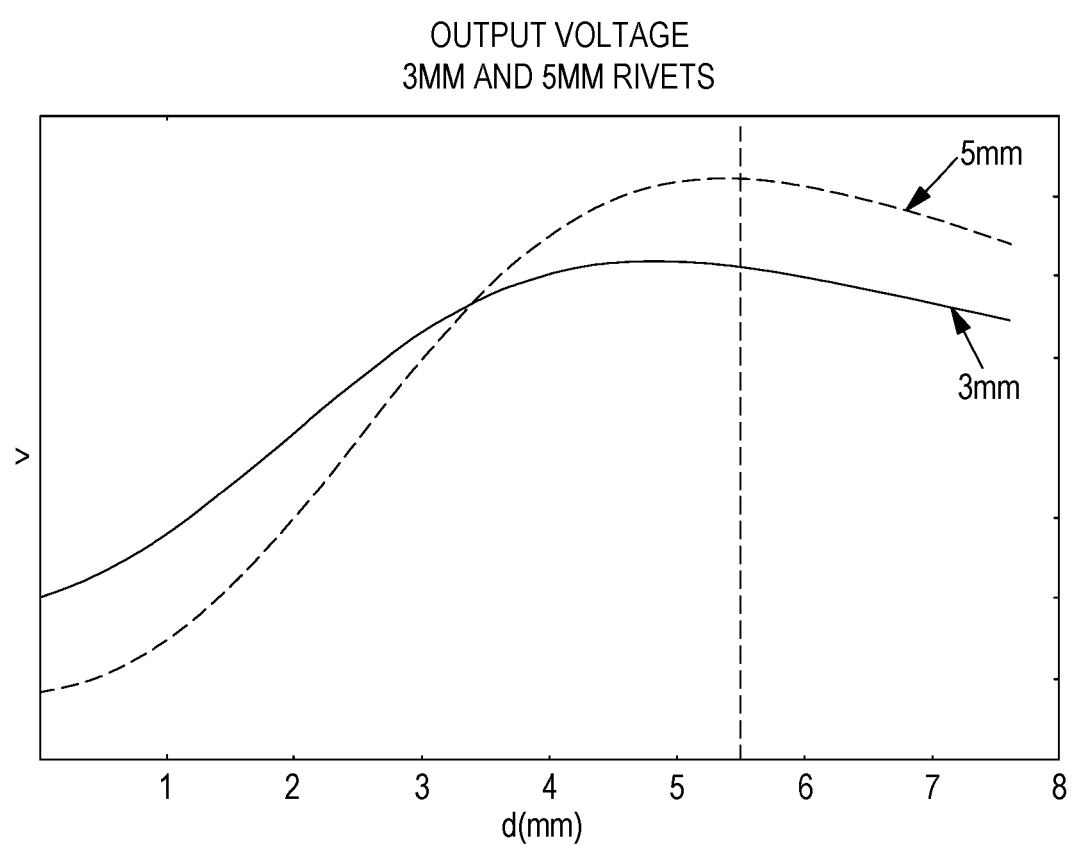
Figure 34C:
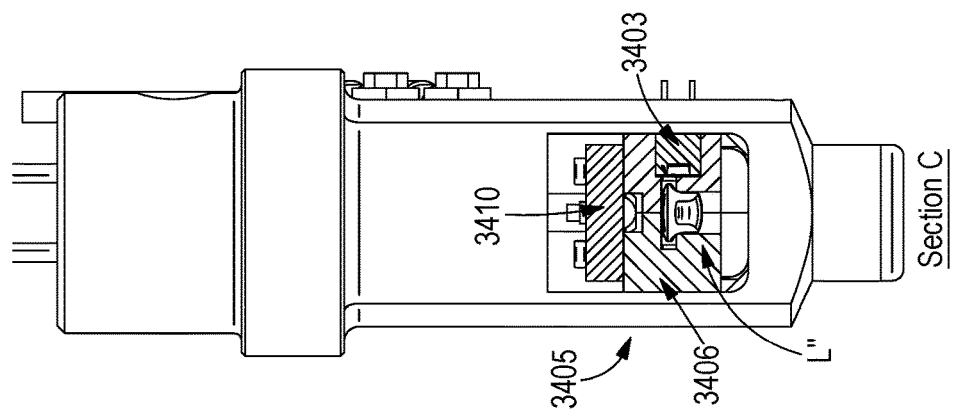
Figure 34B:
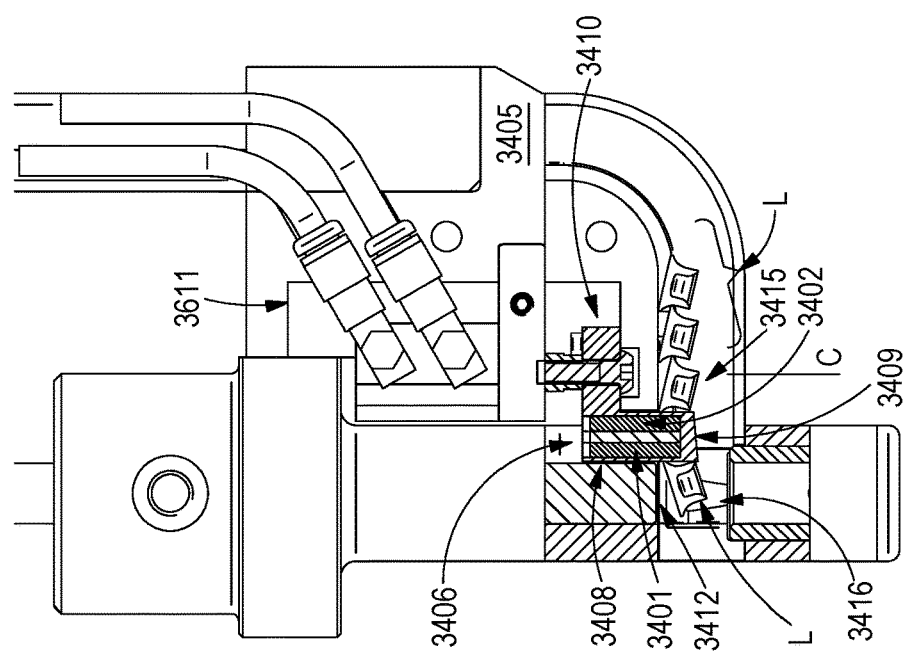
Figure 34A:
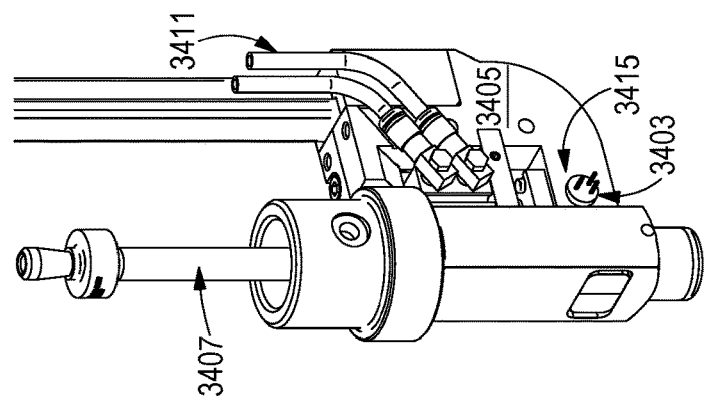
Figure 35C:
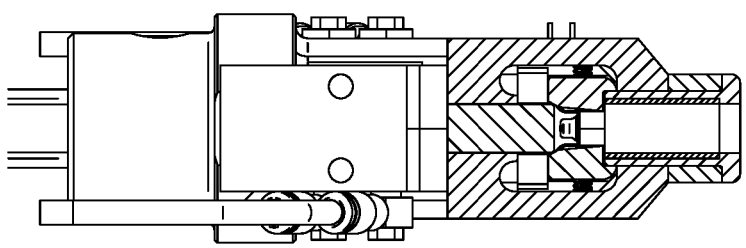
Figure 35B:
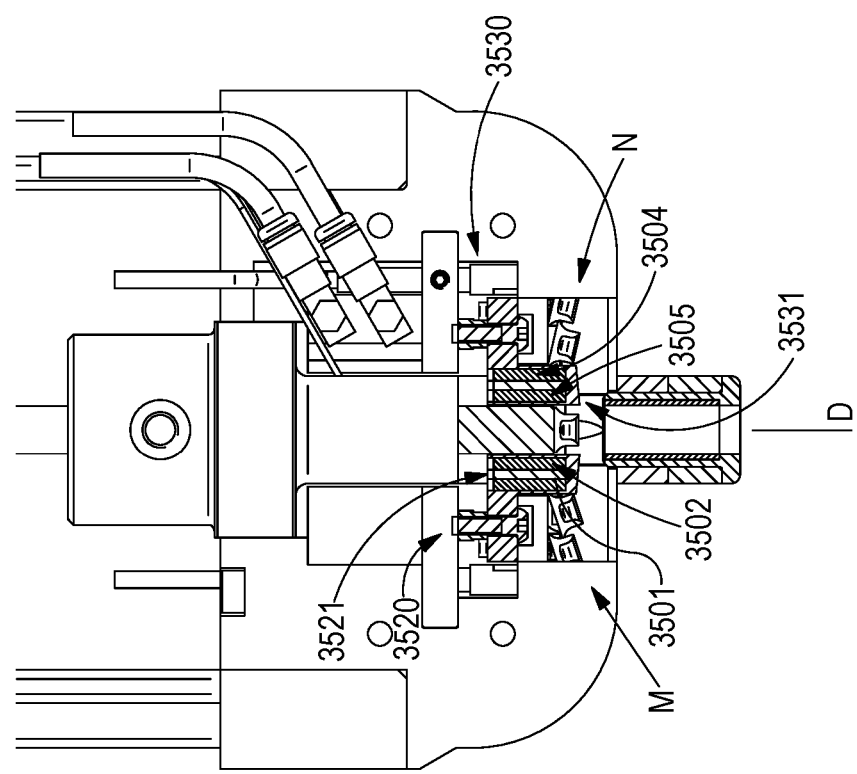
Figure 35A:
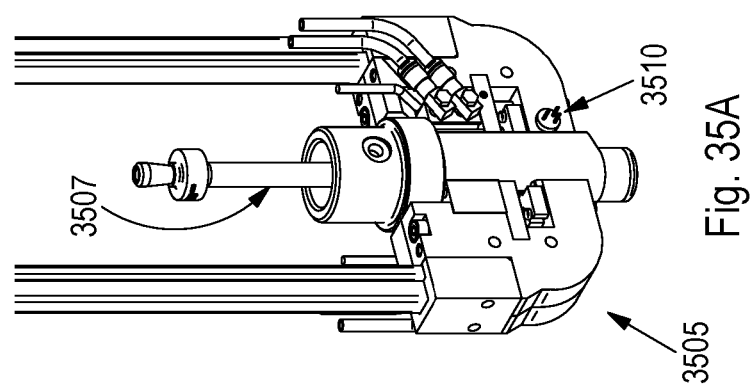

FIGS. 7A-B are front and back perspective views of the movable member of FIGS. 3-6, engaging with self-piercing rivets of different sizes on either side;

FIG. 8 is a front plan view, partly in section, of the movable member of FIGS. 7A-B, revealing magnets;

FIGS. 9A-C are bottom plan views showing different configurations of a passive in-line escapement mechanism which is part of a nose arrangement described herein;

FIG. 10 is a front perspective view, partly in section, of the movable member of FIGS. 7A-B and 8 collecting a rivet from the passive in-line escapement of FIGS. 9A-C;

FIGS. 11A-B are a front perspective and a front plan view, respectively, of a nose arrangement as described herein;

FIG. 12 is a front plan view, partly in section, of selected components of the nose arrangement of FIGS. 11A-B with a movable member in a first configuration;

FIG. 13 is a front plan view, partly in section, of the nose arrangement of FIG. 12 with the movable member in a second configuration;

FIG. 14A is a front perspective view of the nose arrangement of FIG. 13, showing details of a split-track arrangement;

FIG. 14B is a plan sectional view from the back of the arrangement of FIGS. 12-14A that reveals a trapped rivet;

FIG. 15 is a back perspective view of the nose arrangement of FIGS. 14A-B, showing a sensor arrangement;

FIGS. 16A-F are, respectively: a front perspective view; a first front view (partly in section); a second front view (also partly in section); a first enlarged sectional view; a second enlarged sectional view; and, a complete longitudinal section view, of a nose assembly for a nose arrangement as described herein;

FIG. 17 is a front perspective view of another nose assembly described herein;

FIGS. 18A-B are a front perspective view and a front sectional view of a nosepiece for the nose assembly of FIG. 17;

FIG. 19 is a front perspective view of another nose assembly described herein;

FIGS. 20A-B are a front perspective view and a front sectional view of another nosepiece for the nose assembly of FIG. 19;

FIG. 21 is a front perspective view of another nose assembly described herein;

FIGS. 22A-B are a front perspective view and a front sectional view of another nosepiece for the nose assembly of FIG. 21;

FIGS. 23A-D show a riveting sequence based on the nosepiece of FIGS. 20A-B;

FIGS. 24A-C show a riveting sequence based on the nosepiece of FIGS. 22A-B;

FIGS. 25A-B show a riveting sequence based on the nosepiece of FIGS. 18A-B;

FIGS. 26A-B show a riveting sequence based on another nosepiece described herein;

FIGS. 27A-B show schematically an arrangement including a magnet, a rivet held by said magnet and a Hall effect sensor used in a nose arrangement described herein;

FIG. 28 is a front perspective view of the arrangement of FIGS. 27A-B. ie including a 3 mm self-piercing rivet;

FIG. 29 is a front perspective view of the an arrangement similar to that of FIGS. 27A-B and 28, but including a 5 mm self-piercing rivet;

FIG. 30 illustrates schematically principles of rivet sensing using the Hall effect sensor of FIGS. 27-29 for rivets of different sizes;

FIG. 31 represents schematically the magnetic flux B through the Hall effect sensor of FIGS. 27-30 as a function of a distance between the sensor and the magnet;

FIG. 32 represents schematically the output voltage of the Hall effect sensor of FIGS. 27-31 as a function of the distance between the sensor and the magnet of FIG. 31;

FIGS. 33A-C are respectively: a first front perspective view; a second front perspective view, partly in section; and, a plan sectional view from the top, of a further arrangement including a magnet, rivets, and a Hall effect sensor, incorporating a rotary pin escapement used in a rivet feeding line;

FIGS. 34A-C are respectively: a front perspective view; a side view, partly in section; and, a plan sectional view from the back, of an alternative arrangement including two magnets, rivets and a Hall effect sensor, disposed in an different nose arrangement that includes a linear pin escapement for transferring the rivets under the punch; and, FIGS. 35A-C are respectively: a front perspective view; a side view, partly in section; and, a plan sectional view from the back, of yet another arrangement including magnets, rivets, and Hall effect sensors, disposed in an different nose arrangement that includes linear pin escapements for transferring the rivets under the punch from opposite sides around the punch.

DESCRIPTION

As described herein, "nose arrangement" identifies an arrangement for a working end of a fastener setting tool that employs a punch that travels through the nose arrangement to guide a fastener towards a workpiece, and then to set it into said workpiece.

We describe in particular nose arrangements used in self-piercing rivet setting machines of the type that set self-piercing rivets, for example, on plates of various thicknesses, for manufacturing vehicle bodies such as automobile frames and/or panels. However, it will be understood that the present invention is not limited thereto and the arrangements described herein may be equally applicable to a range of different fasteners, although they may be particularly suited to rivets, screws, nails and studs.

The self-piercing rivet setting machines described herein are often incorporated into robotic arms so that they can travel and be positioned where required within a working area, according to many different orientations. To achieve this, the setting tool is mounted on a C-frame which is in turn mounted on the robotic arm. The robotic arm and the C-frame are not described herein in detail. However, it will be understood that the nose arrangements described herein are particularly suited to be mounted on such C-frames and robotic arms by virtue of their fundamentally compact design. Nonetheless, the skilled person will understand that the teachings herein may be equally applicable to different setting tools, designed for different fasteners.

"Nose assembly" identifies a sub-assembly of the nose arrangement that serves to guide the fastener and the punch, after that the punch has engaged the fastener, during a fastener setting operation. The nose assembly is thus responsible for maintaining a correct relationship between the punch and the fastener, before the fastener contacts the workpiece, and while the fastener is being set into the workpiece by the punch, after that the fastener has come in contact with the workpiece.

The action of the punch on the workpiece is typically resisted by a die located at another end of the C-frame. Such dies are not described herein in detail.

"Fastener setting operation" identifies the travel that the punch undertakes for setting a fastener into the workpiece. It will be understood that at the onset of a fastener setting operation, the punch travels without a fastener. Then, on the course of its stroke, the punch comes into contact with a fastener, while the fastener is in a waiting position (termed the "stand-by" position herein) under the punch. The punch then carries the fastener into the nose assembly. More specifically, the fastener is guided by a "nosepiece" which is a tubular member included in the nose assembly. Various designs of nose assemblies and nosepieces are possible, and some are described in detail herein.

The nose arrangements described herein are compactly provided around the punch, in proximity thereof. In such arrangements, there are provided one or more designated "fastener transfer areas", or "fastener transfer zones", where a fastener, having reached the end of a journey—from a bulk feeder, or other bulk storage system, to the nose arrangement, along a fastener supply system—awaits so that it can then be transferred to the stand-by position under the punch, in readiness for a setting operation.

Since the nose arrangements described herein are adapted around the punch, attributes such as "proximal" and "distal" are generally referred to proximity with respect to the punch. Thus, the "proximal end" of a nosepiece will be, for example, that which is positioned closer to the punch than the "distal end". Likewise, attributes such as "inward" and "outward", or the corresponding adverbs "inwardly" and "outwardly" are referenced to the punch and/or its direction or axis. Thus, for example, an inward direction is towards the punch, while an outward direction is away from it. The above terms are provided here for the sake of example, but are not exhaustive.

With reference to the Figures in the accompanying drawings, for ease of navigation any features newly introduced with reference to a given Figure are preferably accorded a reference numeral prefaced by the number of that Figure, each in double digit format. For example, a feature newly described in connection with FIG. 8 may be given reference numeral "0801". A feature newly described with reference to FIG. 12 may be given reference numeral "1212".

Further, in the interest of maintaining ease of reference and navigation throughout the description and the drawings, a given feature may not be described and labelled in connection with all of the Figures that show it. Generally, any features exhaustively described in connection with any earlier Figures are not described again in connection with any later Figures even when they are shown again—unless there is a meaningful interplay with any new features newly described in connection with those later Figures. When this is the case, any previously described features are preferably labelled using any previously used reference numerals. Thus, for example, FIG. 2 can still show feature labelled "0103" which was introduced in connection with FIG. 1. However, the adoption of this convention may not be always be adhered to. This may be the case, for example, when a given feature is shown in a further nose arrangement. This feature may be accorded a new reference number (eg, the punch is labelled as "0201" in FIG. 2 and as "1206" in FIG. 12 since FIG. 2 and FIG. 12 show two different nose arrangements).

In the description and Figures that follow, certain reference numerals are labelled using suffixes such as "l", "r", "f" or "b", which respectively stand for "left", "right", "front" or "back". These suffixes allow certain features to be identified in terms of their relative position according to the views represented in the Figures. However, when a feature is referred to in a context which does not require the identification of its relative positioning, the corresponding reference numeral may be used without these suffixes.

Finally, the self-piercing rivets described herein are labelled with capital letters A, B, C, D, E, F, G, H, J, K, L, M and N, so that they can be easily identified. When multiple rivets are discussed, they may be identified individually using one or more apexes, for example ', '', and''', in addition to the corresponding capital letter.

Figure 1:
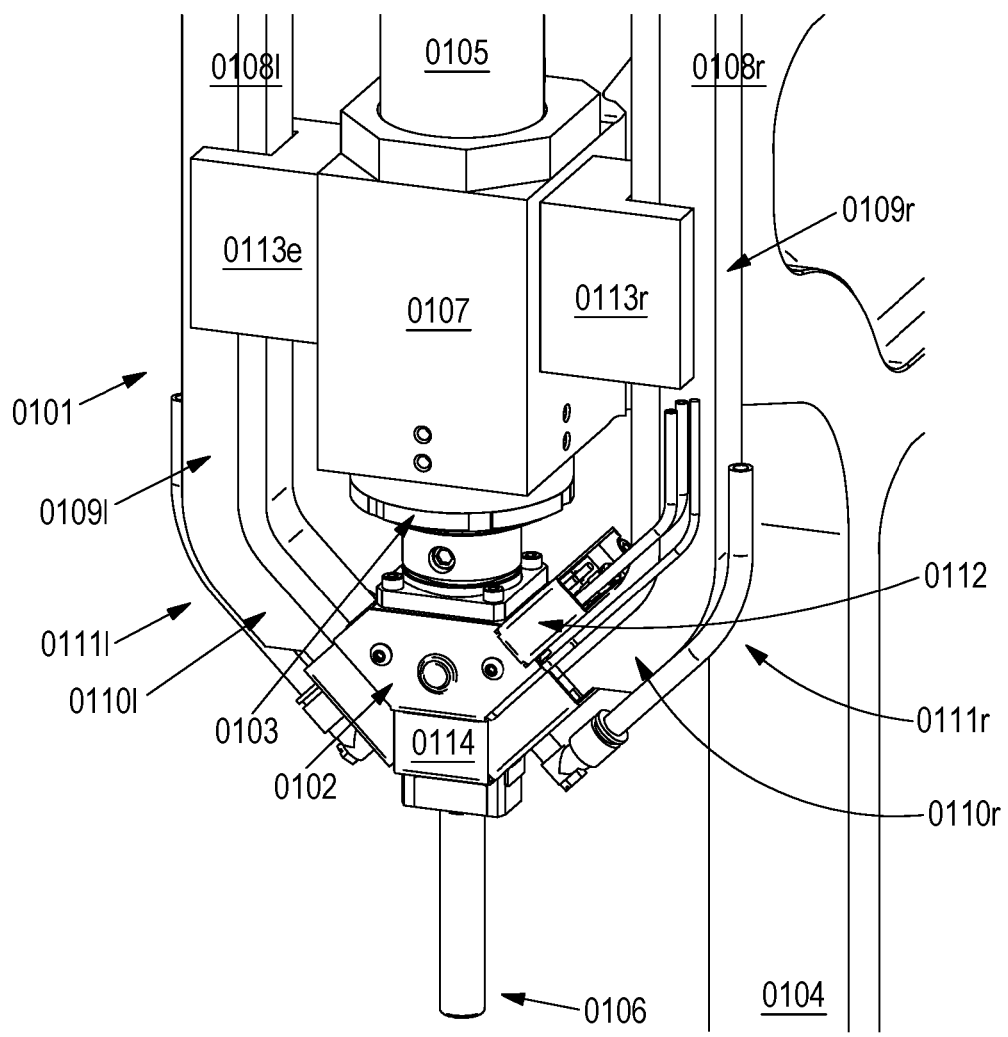
FIG. 1 is a front perspective view of a nose arrangement as described herein mounted on the C-frame of a self-piercing rivet setting machine.
Figure 2:
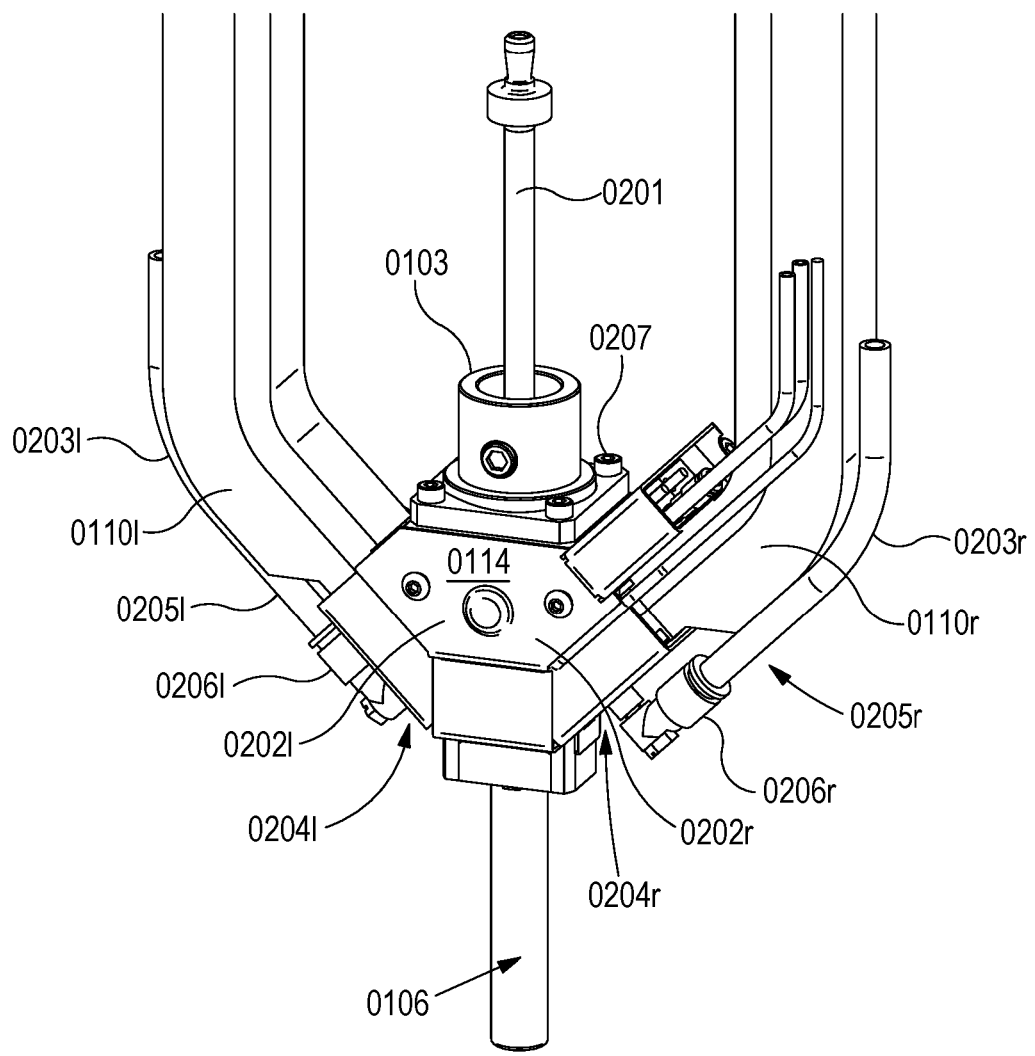
FIG. 2 is a front perspective view of the nose arrangement of FIG. 1 with parts of the setting machine removed to reveal the punch.

With reference to FIG. 1, there is shown a nose arrangement 0101 as described above. The nose arrangement 0101 includes a support 0102 for supporting the nose arrangement on an upper working end 0103 of a C-frame 0104 (note that the use of the word "upper" herein is purely conventional since, as it will easily be appreciated, the C-frame can be inverted in use to install, for example, a self-piercing rivet on the underside of a panel; similar considerations would apply to words such as "lower" and/or to equivalent phraseology including for example "above", "below" or the like). The nose arrangement 0101 is rigidly connected to the upper working end 0103 of the C-frame 0104. However, the upper working end 0103 can move axially with respect to the C-frame 0104 by means of a hydraulic or servo mechanical cylinder arrangement 0105 mounted on the setting tool 0107. However, this feature is not described in any further detail. The location of the nose arrangement 0101 with respect to any given workpiece at the time of initiating a fastener setting operation is thus determined by the position of the C-frame 0104, which, as mentioned above, is mounted on a robotic arm, and by the extension of the cylinder arrangement 0105 on the C-frame 0104. The workpiece is not described herein in any further details, but it is schematically represented for example in FIGS. 23-26.

A nosepiece is disposed within a nose assembly 0106 also provided as part of the nose arrangement 0101, below the support 0102, with respect to the direction of the stroke of a punch 0201, which is part of the setting tool 0107 described herein and which is first revealed in FIG. 2. The punch is not visible in FIG. 1, it being housed and therefore hidden within the cylinder arrangement 0105. The punch 0201 is also actuated, but its operation will not be further described herein. Various nose assemblies and nosepieces will however be described in detail below, especially in connection with FIGS. 16-26.

Within the nose arrangement 0101, a first and a second fastener transfer areas (or zones) 0202r, 0202l are identified inside the support 0102, in the positions shown in FIG. 2. These areas are located laterally with respect to the punch 0201, to the right and to the left thereof as seen in FIG. 2. These areas are designed and designated so that the fasteners can wait in these locations (after these have been delivered to the nose arrangement 0101 from a bulk storage system via a fastener delivery system) to be transferred under the punch 0201, as will be described in further detail below in connection with FIGS. 3-6, 9 and 10. In the nose arrangement 0101 of FIGS. 1 and 2, two fastener transfer areas are provided one 0202r to the right of the punch 0201 and one 0202l to the left. However, it will be appreciated that only one such area can in principle be provided within the nose arrangement without departing from the nose arrangements described herein. We describe below in connection with FIGS. 11-15 a nose arrangement with only one rivet transfer area provided to the right of the punch.

Versions with more than two fastener transfer areas provided within the nose arrangement are in principle possible but are not described herein since they may be less preferable in the interest of maintaining compactness in the overall design of the nose arrangement.

As shown in FIGS. 1 and 2, various accessories are also provided in connection with the nose arrangement 0101. A pair of removable rivet magazines 0108r, 0108l are provided to the right and to the left of the cylinder arrangement 0105 so that up to a predetermined maximum number of self-piercing rivets can be stored locally, on the setting tool, in proximity of the nose arrangement 0101. The rivet magazines 0108r, 0108l are mounted on respective brackets 0113r, 0113l also provided on the C-frame 0104. Each removable magazine 0108r, 0108l serves self-piercing rivets to a respective rivet transfer area 0202r, 0202l. The rivets are retained in the rivet transfer areas 0202r, 0202l by the rivet magazines 0108r, 0108l and this feature will be described in detail below in connection with FIGS. 9 and 12-15.

The rivet magazines 0108r, 0108l each comprise a respective elongated tubular frame 0109r, 0109l with an inwardly bent end portion 0110r, 0110l leading to the respective rivet transfer areas 0202r, 0202r. A magazine elbow 0111r, 0111l is identified in each magazine between the tubular frame 0109r, 0109l and the respective end portion 0110r, 0110l. Best visible in FIG. 2 are right and left vacuum conduits 0203r, 0203l coupled to corresponding vacuum ports 0204r, 0204l provided on lower sides 0205r, 0205l of the end portions of the magazines 0108r, 0108l by means of respective vacuum connectors 0206r, 0206r.

Inside the magazines are respective, longitudinally extending T-sectioned rivet tracks for supplying self-piercing rivets to the rivet transfer areas 0202r, 0202r. The vacuum devices described here simply help create a vacuum condition (which, as it will be appreciated, does not need to be perfect) in the rivet tracks inside the magazines and this condition may facilitate the handling and the movement of the rivets inside the magazines and/or their delivery to the rivet transfer areas 0202r, 0202r, as it will be described in further detail below. As it will be appreciated, the magazines 0108r, 0108l could supply rivets of different sizes and shapes (for example rivets having the same diameter, but different length), or they could be used to supply the same type/size of rivets symmetrically from either side of the punch 0201. In conjunction with the transfer mechanism described below, the speed of the provision of rivets of a given type and size under the punch can accordingly be augmented or maximised.

Also visible in FIG. 1 is an operations link 0112 providing electrical, electronic wireless and/or pneumatic supply and/or pick-up for any sensing, indexing, escapement and/or actuation means provided within the nose arrangement 0101. A number of such means will be described herein in a non-exhaustive fashion. The operations link 0112 is coupled to the support 0102 of the nose arrangement 0102 on an upper side thereof, on the right-hand side in the described arrangement shown in FIGS. 1 and 2. However, different coupling locations are also possible. Further, the operation link 0112 shown in FIGS. 1 and 2 provides for three types of connections: one electrical connection for a rivet sensor provided within the support (this will be described in further detail in connection with FIGS. 3-6, 12-15 and 27-32), one supply connection for supplying compressed air to a cylinder/piston actuator also provided within the support (this will also be described in further detail below—see FIG. 3 for example); and one return compressed air connection for the same actuator, with an actuator position sensor incorporated (but now shown). However, different possible arrangements can provide for more or fewer connections at the operations link 0112, as the case may be, depending on what means, if any, are provided within the support 0102, in the nose arrangement 0101. These details are not described further herein.

As best seen in FIG. 2, the support 0102 described herein has the general shape of an enclosure 0114 assembled around the upper working end 0103 of the C-frame. In this nose arrangement, the enclosure 0114 includes front and back, and upper and lower sides. The enclosure is instead open on the left and right-hand sides to receive the rivet magazines 0108r, 0108l. The upper side is adapted for connection to the upper working end of the C-frame 0103—in this case via four bolts 0207. The lower side is adapted for receiving and supporting the nose assembly 0106—also via bolts (not shown in FIG. 2). The front and back sides are generally in the shape of an irregular polygon presenting a downwardly extending projection. However, these shapes are non-limiting and other configurations or shapes are possible. The left and right proximal end portions 0110r, 0110l of the removable magazines 0108 are received in the enclosure 0114 as seen in FIG. 2. From there, the rivets are supplied to the nose arrangement 0101, for then being positioned in the stand-by position under the punch when necessary, through respective outlets provided on said proximal ends of the removable magazines 0108. This will be described in further detail in the remainder of this description.

Figure 4:
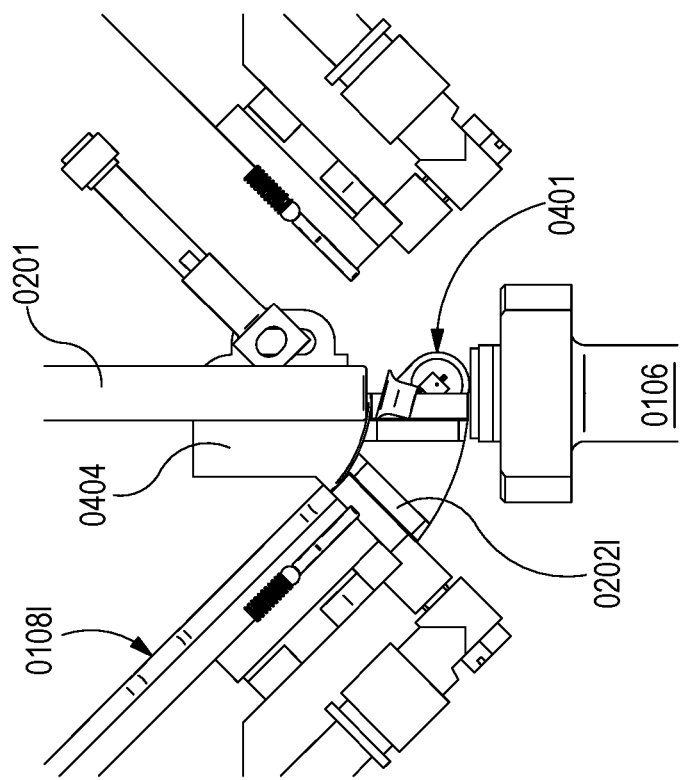
FIG. 4 is a front plan view similar to that of FIG. 3 with the movable member in a second configuration.
Figure 3:
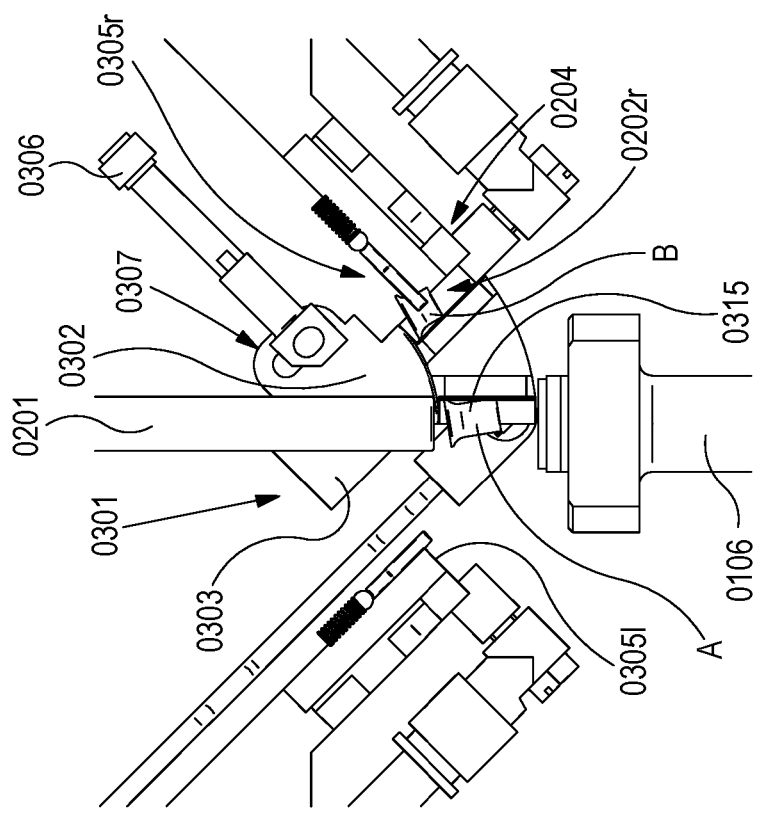
FIG. 3 is a front plan view of the nose arrangement of FIG. 1 with parts removed to reveal a rivet transfer mechanism as described herein, with a movable member in a first configuration.

Housed in the support 0102 is a transfer mechanism 0301 for transferring the rivets from the first and the second fastener transfer areas 0202 under the punch 0201. As shown in FIGS. 3 and 4, the transfer mechanism 0301 includes a movable member 0302 that can be moved between first and second configurations 0303, 0404.

As shown in FIG. 3, in the first of said configurations 0303, the movable member 0302 is adapted to hold a first rivet A in a stand-by position 0305 under the punch 0201, waiting for a fastener setting operation. Further, in this same configuration the movable member is adapted to collect a second rivet B from the right fastener transfer area 0202r—if such rivet B has been made available at the corresponding rivet transfer area 0202r, which is now the case. In the case of FIGS. 3 and 4 the left and right-hand side rivets A, B have the same diameter but a different length. However, in the case of FIGS. 5 and 6 the rivets A and B have the same diameter and length.

As shown in FIG. 4, in the second of said configurations 0404 the movable member 0302 is adapted to hold the second rivet B in said stand-by position 0305, and is adapted to collect a third rivet (not shown in FIG. 4) from the left fastener transfer area 0202l, assuming that said third rivet is in the meantime made available at the left rivet transfer area 0202l. The to-be-collected rivet A has not yet been delivered to the transfer area 0202l by the magazine 0108l. Revealed in FIG. 4 is also a sensor 0401 for the detection of the presence of a rivet under the punch 0201. The operation of the sensor 0401 will be described in further detail in connection with FIGS. 27-30.

Thus, with self-piercing rivets A, B being delivered by the magazines 0108r, 0108l to the first and second rivet transfer areas 0202r, 0202l within the nose arrangement 0101, the transfer mechanism 0301 is responsible for collecting the rivets and repositioning them in the stand-by position 0315 under the punch 0201, in preparation for rivet setting operations. The described arrangement is compact and convenient since rivets A, B of equal or different type/size can be delivered in the nose arrangement 0101 at symmetrically opposed locations with respect to the punch 0201, as required by the current riveting application. The movable member 0302 of the transfer mechanism 0301 cycles between the first and second configurations 0303, 0404 and can alternatively collect rivets from the respective magazine outlets 0305, and hold them one at a time under the punch 0201. The magazines make or do not make available rivets at the transfer areas 0202 depending on the required sequence of rivets to be set (one from one side, then one from the other, or for example two rivets from the same side).

A shown in FIGS. 3 and 4, as part of the described transfer mechanism there is also provided a pneumatic cylinder-piston actuator 0306 disposed within the enclosure 0114 that forms the support 0102 of the nose arrangement 0101. While the present system uses a pneumatic actuator, it is understood that other forms of actuation would be possible including for example an electrical actuator. The actuator 0306 described herein is connected at its proximal end to an actuation attachment 0307 provided on the movable member 0302, and at its distal end to the support 0102 of the nose arrangement. However, other configurations are in principle possible, for example with the distal end of the actuator being supported on the axially movable working end 0103 of the setting tool 0107.

In the nose arrangement described herein, as can be appreciated from FIGS. 3 and 4 the movable member 0302 extends parallel to and wraps around the punch. The punch is accommodated during its stroke by suitably formed surfaces of the movable member 0302. These will be described further below, as they also collect and hold the rivets in position. The movable member 0302 is pivotally attached to the support 0102 within the nose arrangement 0101. In other words, the movable member is generally configured as a pendulum that can be swung from a magazine's outlet 0305 to the other to collect one at a time the rivets A, B—if they are made available at the transfer area by the magazines 0108. Once a rivet B has been collected by the transfer mechanism while the movable member is in the first configuration 0303 (as shown in FIG. 3), the rivet B is then transferred by the transfer mechanism 0301 to the stand-by position 0315 under the punch 0201 (as shown in FIG. 4) following a clockwise rotation of the movable member 0302 around its pivot, rotation which brings the transfer mechanism 0301 in the second configuration 0404. The movable member 0302 is now ready to collect a further rivet A from the magazine 0108l on the opposite side of the punch, and this is shown in FIGS. 4 and 5.

Figure 5:
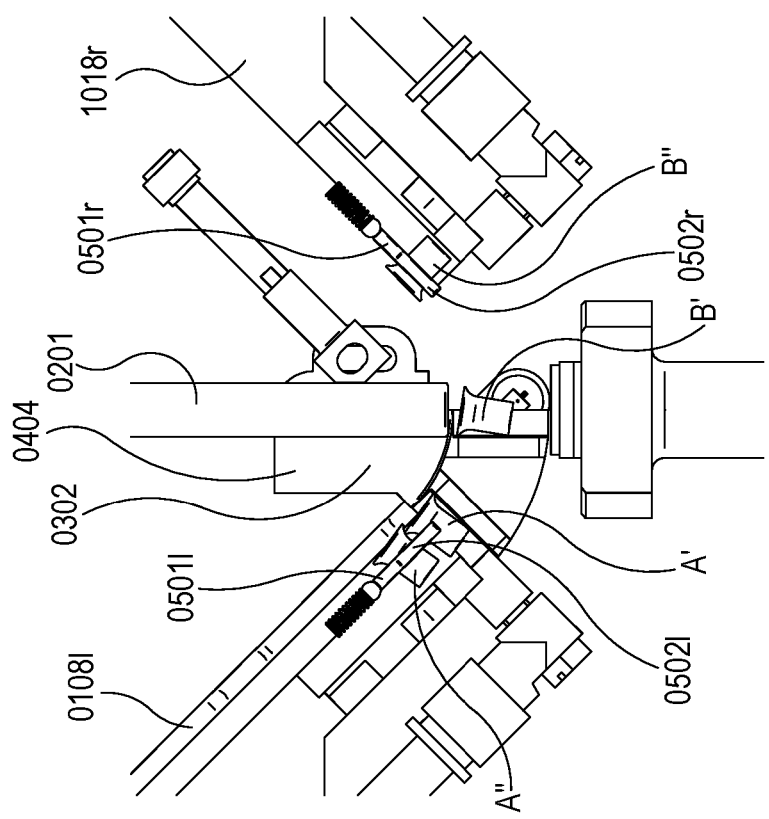
FIG. 5 is a front plan view similar to that of FIGS. 3 and 4, with the movable member in the second configuration collecting a rivet on the left-hand side.

FIGS. 5 and 6 are similar to respectively FIGS. 4 and 3 with regards to the configurations of the movable member, but show rivets A, B of the same length, as previously mentioned. The set up shown in FIGS. 5 and 6 thus corresponds to the quickest method of feeding rivets of a given shape (ie size and length) using two symmetrically configured removable magazines. If the two magazines are instead used to supply rivets of different shapes (ie size or length), any cycle for feeding rivets of a predetermined shape from any one of the left and or right-hand sides of the arrangement under the punch will last longer—other conditions being held constant.

While the movable member 0302 described in FIGS. 3-6 is pivotally arranged on the nose arrangement support 0102, alternatively the movable member 0302 could be provided as a linear slider disposed substantially perpendicular to the punch in a guide located within the nose arrangement. This alternative arrangement is however not described herein in further detail since it is not preferred.

Returning now to FIG. 5, a rivet B' collected by the movable member from the right-hand side magazine 0108*r* is now held by the movable member 0302 in the stand-by position 0315 under the punch, while the movable member on the left-hand side of FIG. 5 collects a rivet A' from the left-hand size magazine 0108*l*. The movable member 0302 is now in its second configuration 0404 and the actuator 0306 is in an extended configuration. The to-be-collected rivet A' is held in the left-hand side transfer area 0202*l* by a passive in-line escapement 0501*l* which will be described in detail in connection with FIG. 9. The passive in-line escapement 0501*l* includes a pair of resiliently biassed jaws 0502*l* disposed either side of the rivet track that runs longitudinally in the magazine, at the outlet of the magazine. In the nose arrangement 0101 of FIGS. 1-6 the passive in-line escapements 0501*r*, 0501*r* are operated to release the rivets by contact with the movable member 0302. Alternatively, however, the rivets A, B could be drawn to the movable member by a suitable force, for example a magnetic force, when the movable member is in the first or second configurations, with, for example, a magnet next to the rivets waiting in the transfer areas.

Thus, with reference to FIG. 5, there are represented two rivets A', A" on the left-hand side of the nose arrangement. The leading rivet A' is released by the jaws 0502*l* under the action of releasing action imparted to the jaws 0502 by the movable member, and is collected on the movable member 0302. When required, the punch will initiate a rivet setting operation to set the leading rivet B' that has been previously collected from the right-hand side magazine 0108*r* and which is currently in the stand-by location 0315 under the punch. Once that rivet B' has been set, the punch will retract to its initial configuration and the actuator 0306 will retract so as to rotate the movable member anticlockwise. The movable member 0302 therefore now returns to its first configuration 0303 shown in FIG. 6, wherein the leading rivet A' is now positioned under the punch in the stand-by position and the movable member collects the trailing rivet B" on the right-hand side in a similar fashion as that described in connection with the leading rivet A' on the left-hand side. The transfer cycle implemented by the transfer mechanism 0301 is therefore now complete, and will start again when required.

As the skilled person appreciates, it is not necessary to set the rivets A, B supplied on the opposite sides of the punch in perfect alternate order (that is, for example, according to the sequence A, B, A, B, etc.). Each magazine and/or rivet supply line associated thereto are typically further equipped with one or more rivet handling mechanisms upstream of the magazine outlets 0305. These rivet handling mechanisms are not described herein in further detail. However, they allow the setting tool 0107 to set the rivets according to any required sequence, for example A, A, A, A, B, A, B, B etc. When two rivets from the same feeding side, for example two rivets A, are to be set in sequence in connection with the nose arrangement illustrated by FIGS. 1-6, one or more rivet handling mechanisms provided in connection with the right-hand side magazine retain the rivets B upstream of the magazine outlet so that the movable member 0302 will, for a predetermined number of cycles, fail to collect any rivets B from the right-hand side magazine 0108*r*, thereby implementing the required sequence, albeit comparatively less quickly than if the two A rivets were fed from opposite sides. FIG. 4, if considered in isolation, may represent a situation in which the movable member 0302 fails to collect a rivet A on the left-hand side while a rivet B, previously collected on the right hand side, is in the stand-by position under the punch awaiting a setting operation.

Taking now a closer look at the transfer mechanism 0301, FIGS. 7 and 8 illustrate in additional detail the movable member 0302 of FIGS. 1-6. The following description is non-limiting in that it will be appreciated that a variety of shapes and/or configurations are possible and these will generally be determined by any specific riveting or fastening applications of the general principles illustrated herein, and by the type of fastener and setting tool in question.

With reference to FIG. 7A, the movable member 0302 includes a pair of front and back plates 0701*f*, 0701*b* which, in use, would be arranged at the front and back of the punch so that the punch can pass therethrough unobstructed, and which support, in between, at their lower end, a rivet carriage 0702.

The plates define a pivotal attachment 0703 for pivoting the movable member on the support, as previously described. In the described arrangement, the pivotal attachment 0703 is provided as a pair of aligned circular apertures 0704*f*, 0704*b* provided, respectively, on the front and back plates 0701*f*, 0701*b*, on an upper end thereof. However, other configurations would be possible.

The plates further define a plate actuator attachment 0705 for connection with the actuator 0306, also provided on the upper end of the plates, to the right of the pivotal attachment as shown in FIGS. 7A-B. In the described arrangement, the plate actuator attachment 0705 is provided as a pair of aligned elongated slots 0706*f*, 0706*b* also shown in FIGS. 7A-B. However, other configurations would be possible.

In the described arrangement, the rivet carriage 0702 is in the shape of a solid block 0707 having a general circular crown shape, with front and back sides, upper and lower sides, and right and left rivet capture surfaces 0708*r*, 0708*l* located on respective right and left sides 0710*r*, 0710*l* of said block 0707. In the described arrangement, the rivet capture surfaces 0708*r*, 0708*l* are provided in the form of magnetic faces which attract the rivets as they are made available at the in-line escapements at the outlets of the magazines.

Accordingly, embedded in the block 0707 are a pair of permanent neodymium magnets 0801*r*, 0801*l* shown in FIG. 8. As shown in FIG. 8, the magnets 0801*r*, 0801*l* are placed in the rivet carriage 0708 by insertion through appropriate rectangular recesses 0802*r*, 0802*l* provided in the block 0707. The magnets 0801*r*, 0801*l* are covered by respective magnet protectors 0803*r*, 0803*l*. Therefore, the rivets A, B do not come in direct contact with the magnets but instead contact directly respective outer surfaces of the magnet protectors which, in the present arrangement, represent the rivet capture surfaces 0708*r*, 0708*l*.

As shown in FIG. 7A-B, the block 0707 forming the rivet carriage 0702 conforms to the shape of the rivets A, B in connection with the rivet capture surfaces 0708*r*, 0708*l*. The rectangular recesses that accommodate the magnets are recessed from corresponding right and left curved profiles defined by the block. The magnet protectors 0803*r*, 0803*l* are made of a compliant material that follows the shape of these curved profiles as shown in FIGS. 7-8. The rivet block can thus be manufactured with said recesses, the magnets inserted and the magnet protectors then installed to cover the magnets. The block 0707 may be manufactured from resilient material or, alternatively, the magnets can be bedded into a resilient mounting for the purpose of absorbing shock resulting from kinetic energy of arriving rivets. The magnets can still be extracted and replaced from the bottom, curved surface of the block, if necessary, without removing the magnet protectors. Magnet sizes, shapes, profiles, and/or properties may be varied according to in use holding requirements, and these may vary between different riveting and/or fastening applications. It may be important to fine tune or engineer the performance of the magnets to match the requirements of any such specific applications.

Other rivet capture configurations and/or features would however be possible on the rivet carriage. For example, electromagnetic elements could be incorporated into the block 0707 instead of the permanent neodymium magnets described above. However, these alternatives are less preferred and are therefore not described herein.

Alternatively, the rivet capture surfaces could be provided by mechanical rivet capture means as known in the art, for example in the form of one or more mechanical probes that are designed and configured to hold the rivets between corresponding jaws or the like. Although these arrangements are possible, the permanent magnets represent the currently preferred solution since they contribute to the overall compactness of the nose arrangement described herein, while being reliable, low cost, and devoid of moving parts, thus relatively easy to implement and/or engineer.

As mentioned above, importantly, the configuration of the movable member 0302 with the front and back plates 0705*f*, 0705*b* means that the movable member is appropriately configured to receive the punch without obstructing it when the punch 0201 is operated to set a rivet. Alternative arrangements could do away with the actuator 0306 if the body of the movable member was configured such that the movable member is actuated by the punch or a body associated with the moving punch while the punch travels to perform a fastener setting operation. This arrangement would have the advantage of dispensing with the ancillary actuation requirements. However, as it will be apparent, any contact between the punch and the transfer mechanism may lead to increased wear and tear of the nose arrangement and/or some of its most valuable components. Accordingly, this alternative set up may in principle only be suitable to a limited number of riveting and/or fastening applications.

In the nose arrangement described herein, the movement of the movable mechanism between the first and second configurations is limited by limiting means (not shown) located in the actuator 0306. Accordingly, the first and second configurations of the movable member described in connection with FIGS. 3-4 are also limiting configurations for the movable member in that the movable member is prevented by the limiting means from moving angularly any further than the first configuration anticlockwise (see for example FIG. 3), and the second configuration clockwise (see for example FIG. 4). Importantly, this may lead to extended life of the arrangement as the outlets 0305 of the magazines 0108 are not subjected to wear and tear.

In the first configuration 0303 shown in FIGS. 3 and 6, the magnetic rivet capture surface 0708*r* on the right-hand side of the movable member 0302 comes into close proximity with the rivets B such that the leading rivet B', initially waiting at the rivet transfer area 0202*r* on the right-hand side of the arrangement, is then extracted by the rivet carriage 0702 which releases the retractable jaws 0502*r* of the in-line escapement 0501*r*. The rivet B', attracted by the magnet 0801*r*, comes into contact with the rivet capture surface 0708*r* once the jaws 0502 have been released. Alternatively the magnet may release the jaws, or a combination of these two mechanisms could be used. Simultaneously, a right-hand side sealing surface 0709*r* provided on the right-hand side 0710*r* of the block 0707 of the movable member seals the rivet track in the right-hand magazine 0108*r* so that the vacuum condition described above can be implemented also to help with the transfer of the rivet B' to the movable member first and then to the stand-by position 0315. Note that the sealing implemented by the moveable member 0302 also prevents dust entering the stand-by area. This dust would conventionally reach the stand-by area together with the rivet, as the rivet and the dust are moved together to the stand-by area by a jet of compressed air. Thus the pairs of jaws 0502 described, for example, in connection with FIG. 5 may be completely absent from, for example, the arrangement shown in FIGS. 3 and 4. In this case, the movable member 0302 would accept rivets delivered directly to it from any upstream location, for example from a location inside the magazine 0108.

In the second configuration 0404 shown in FIGS. 4 and 5, likewise the magnetic rivet capture surface 0708*l* on the left-hand side of the movable member 0302 comes into close proximity with the rivets A such that the leading rivet A', initially waiting at the rivet transfer area 0202*l* on the left-hand side of the arrangement, is then extracted by the rivet carriage from the retracted jaws 0502*l* of the in-line escapement 0501*l* and subsequently held in contact on the rivet capture surface 0708*l*. Simultaneously, the left-hand side sealing surface 0709*l* provided on the left-hand side 0710*l* of the block 0707 of the movable member seals the rivet track in the left-hand magazine 0108*l* so that the vacuum condition described above can be implemented to help with the transfer of the rivet A to the movable member first and then to the stand-by position 0315.

The sealing surfaces 0709*r*, 0709*l* are each distributed on three sides of the rivet carriage: the upper and lower sides; and, the right-hand 0710*r* or left-hand 0710*l* side of the rivet carriage, as illustrated by FIGS. 7A-B. In this way, the sealing surfaces can provide an adequate and effective seal when the rivet carriage 0702 comes into contact with the magazine outlets 0305.

It would be possible for the magazine outlets 0305*r*, 0305*l* to be used as the limiting means. In this configuration, the actuator 0306 is not limited by any limiting means provided therein, such as any mechanical stoppers which could be provided internally in the actuator 0306, but the clockwise and anticlockwise rotations of the movable member are instead limited by the abutment of the sealing surfaces 0709*r*, 0709*l* with the respective magazine outlets 0305*r*, 0305*l* of the rivet magazines 0108*r*, 0108*l*. Although this configuration is in principle possible, as discussed above it may not be preferred in applications where tear and wear of the abutting surfaces could cause issues.

FIG. 9 explains the operation of the resiliently biased jaws 0502*l* provided on the left-hand side of FIGS. 3-6. The rivets A are seen from the underside 0205*l* of the left rivet magazine 0108*l*.

In FIG. 9A, under the action of a pair of springs 0901 accommodated to extend longitudinally within the rivet magazine 0108*l*, the two jaws 0502*l*, located on opposed sides of a rivet track 0902, are initially in a closed status to retain the rivets A at the outlet 0305*l* of the rivet magazine. In more detail, the rivets A are held against inwardly extending projections 0903 extending transversally from the jaws 0502*l* into a space just outside the track 0902, just outside the magazine.

When the transfer mechanism 0301 rotates clockwise into the second configuration 0404 represented in FIG. 9B, a portion of the left-hand side sealing surface 0709*l* situated on the left-hand side of the block 0707 strikes against outwardly protruding cams 0904 also provided on the jaws 0502*l*, opposite the projections 0903. This opens the jaws at the magazine outlet 0305 and allows the leading rivet A' to be attracted and retained in place on the rivet carriage by the permanent magnet 0801 on the rivet capture surface 0708*l*. The leading rivet A' is thus transferred from the left-hand side magazine 0108 to the rivet carriage 0702. The leading rivet A' is now ready to leave the rivet transfer area 0202*l* to be positioned under the punch in the stand-by position awaiting a setting operation. The transfer may be aided by compressed air blown into the rivet track 0902, or by the vacuum condition described above. The trailing rivet A" (visible in both FIGS. 9A-B) then replaces the leading rivet A' and its stem portion comes into contact with the inwardly extending projections 0903 of the jaws 0502*l*. Further, a third rivet A''', as shown in FIG. 9B, is released by the magazine and queues at the magazine outlet 0305*l*. It will be appreciated that in an alternative arrangement of the jaws, the jaws may act on the head portions of the rivets rather than on their stem portions.

As the rivet carriage 0702 moves away from the magazine 0108*l*, the resiliently biassed jaws 0502*l* reset their position under the action of the springs 0901, as shown in FIG. 9C. The trailing rivet A" is now waiting in the left-hand side rivet transfer area 0202*l*. The springs 0901 impinge on a rear outwardly extending cam 0905 to rotate the jaws around respective pins 0906 in an opposed direction of rotation to close the rivet track 0902. Note a jaw singular would provide the necessary working conditions to trap a rivet. A jaw pair provides redundancy in the system in the event of a spring failure for example.

FIG. 10 illustrates in greater detail the sealing engagement of the rivet carriage 0702 with the magazine while the movable member is in the first configuration of FIG. 3, which configuration is used to transfer the rivets B. A rivet track cover member 1001 is provided in the right-hand track magazine to cover a corresponding rivet track 0902*r* also provided in the magazine. Part 1004*r* of a lower side 1003*r* of the rivet track cover member 1001 seals against a portion of the rivet carriage upper side. The cover member and the rivet carriage have complementary shapes that form part of said sealing engagement. The rest of the sealing engagement is provided by the vacuum connector 0206*r* which is connected to the vacuum port 0204*r* and is suitably shaped to contribute to the sealing arrangement by sealing against the lower portion 1002*r* of the rivet capture surface 0708*r*. However, it will be appreciated that the vacuum connector may alternatively work as an exhaust port for any compressed air blown into the rivet track to deliver, or facilitate the delivery, of the rivets.

Importantly, the sealing arrangement also acts to screen the punch area, and therefore the stand-by position 0315, from ingress of any dust coming from the magazine track 0902*r*. The arrangements described herein are particularly sensitive to this problem when compressed air is used to transfer the rivets from the magazine under the punch (alternatively, gravity can be used, or the vacuum condition described above could be used—however, when compressed air is used it is possible that this introduces into the nose arrangement any unwanted dust). Any such dust is known to potentially cause a buildup and, in extreme cases, may lead to mechanical failure of the moving parts including the setting operation.

FIGS. 11-15 show a different nose arrangement 1101. The arrangement shown in FIGS. 11-15 includes a transfer mechanism 1201 adapted to transfer the rivets, one at a time, from the rivet transfer area 1107 to the stand-by location under the punch. FIGS. 11-12 illustrate the general arrangement. The rivet transfer mechanism 1201 is illustrated in more detail with reference to FIGS. 12-13. FIGS. 14-15 illustrate in more detail a different in-line escapement than that previously described.

A first, immediately apparent distinction between the nose arrangement 1101 of FIGS. 11-15 and that 0101 of FIGS. 1-10 is that the nose arrangement 1101 includes only a single rivet supply line 1102 located on the right-hand side on FIGS. 11A-B, while the previous nose arrangement 0101 included two rivet supply lines on opposite sides of the punch.

Further, the rivet supply line 1102 described herein does not comprise a removable rivet magazine as such, but includes a chute 1103 and a flexible hose 1104 coupled to said chute, upstream of the chute 1103. Through the flexible hose 1104 and the chute 1103 extends a rivet track 1105 generally having a T-shaped cross section 1106, as discernible from FIG. 11A, for the supply of self-piercing rivets of one or more appropriate, predetermined sizes to a rivet transfer area 1107 located laterally with respect to the punch, shown to the right-hand side in FIGS. 11A-B.

Various elements of the arrangement shown in FIGS. 11-15 are similar to the arrangement previously described. For example, the C-frame, the setting tool, the punch, the support for supporting the nose arrangement on the setting tool, the nose assembly, etc. have all been previously described and will thus not be described further in connection with FIGS. 11-15. Visible in FIG. 11A is also the upper portion of the hydraulic or servo mechanical actuation arrangement of the setting tool. This is similar to that described in connection with FIG. 1, although FIG. 1 did not show this part of the arrangement.

With reference to FIGS. 11-12, the rivet transfer mechanism 1201 is in principle similar to that of FIGS. 1-10, although it includes a movable member 1202 with only one rivet capture surface 1203 on the right-hand side of the rivet carriage 1204. Similar to the nose arrangement described earlier, the rivet carriage 1204 supports a permanent neodymium magnet 1205 for transferring the rivets C from the chute 1103 to a stand-by position 1301 under the punch 1206. FIG. 12 shows the punch in a retracted configuration 1207, while FIG. 13 shows the punch in an extended configuration 1302 just prior to engagement with a rivet C, during a setting operation. As it can be appreciated from these Figures, here it is the punch 1206 that actuates the movable member 1202 as required. It will be noted the absence of an independent actuator to swing the movable member 1202 from a first, rivet-collecting position 1215 to a second position 1216 where the movable member 1202 holds a rivet C in the stand-by position, or vice versa.

As shown in FIG. 12, the chute 1103 is supported on the nose arrangement 1101 by a set of bolts 1208. A set of resilient bias members 1209 are in addition provided in this arrangement in the form of a set of compression springs to serve as indexing means, in other words to register the movable member 1202 precisely in place once the punch 1207 is retraced. The nose arrangement provides for escapement of the rivets C from the chute via a splitted-track arrangement 1210 whose operation will now be described.

With continued reference to FIG. 12, the movable member 1202 is now in the rivet collecting position 1215. The movable member 1202 includes a pivoted camming surface 1212, in the form of an inclined plane 1213, inclined with respect to the axis of the punch, so as to at all times maintain contact with the punch 1206, even when the punch is in the retracted configuration 1207. With the punch 1206 retracted, and the indexing means 1209 in their extended configuration, the movable member 1202 resets the splitted-track arrangement 1210 so that a leading rivet C' can be released by this escapement 1210 onto the magnetic rivet capturing surface 1203 of the movable member 1202. At this time, the leading rivet C' is captured onto the surface 1203 of the movable member and a trailing rivet C" is in free flow relationship in the rivet track 1407 in the chute 1103 and therefore subsequently replaces the leading rivet C' in the rivet transfer area 1107.

The splitted-track arrangement 1210 is implemented on a proximal (or lower) end portion 1211 of the chute 1103. This lower end portion 1211 of the chute 1103 includes fixed and movable half-track members 1403, 1404, as best seen from FIGS. 14-15. The movable half-track member 1404 is pivoted on the chute 1103 around a pin 1405 and its pivoted (or splitted) position is determined by a biasing means 1406 housed in the chute 1103, as also shown in FIGS. 12 and 13. The biasing means 1406 causes the pivoted movable half-track member 1404 of the splitted-track arrangement 1210 to rotate clockwise as shown in FIGS. 14A-B to deform the rivet track 1407 at the lower end portion 1211 of the chute, while the movable member is in the position 1216 holding the rivet C' in the stand-by position. Accordingly, the trailing rivet C" is retained in the chute and cannot flow for collection by the movable member 1202, as shown in FIG. 14B. FIG. 14B further shows details of the retention of the trailing rivet C" within the splitted-track arrangement 1210. In particular, it will be noted that the head of the rivet C" is trapped between portions of the deformed T-shaped rivet track 1407. In more detail, the upper surface of the rivet C" is pressed against the upper inner side of the rivet track 1407 on the fixed half-track member 1403 on the right-hand side half of FIG. 14B. The lower side, or lip, formed by the head of the rivet C" is retained by the lower inner side of the transversal part of the T-shaped profile of the rivet track 1407 on the left-hand side half of FIG. 14B. For the rest, the operation of this nose arrangement is similar to that of the nose arrangement previously described.

FIG. 14A is a perspective view, from the front, of the arrangement of FIGS. 12-13 with the movable member in the configuration 1216 of FIG. 13. This Figure reveals in clearer detail the operation of the splitted-track arrangement 1210 which is, in this arrangement, used to replace the in-line escapement previously described. It will be understood that the track 1407 does not need to be split in halves. A different longitudinally splitted pattern would be possible. For example, it would still be possible to trap the leading rivet C" as trapped in FIG. 14B by splitting the track 1407 such that the fixed track member 1403 instead of extending for half the track width extends, for example, for ⅔ of the entire width of the track 1407 or towards one edge of the rivet head such that the main portion of the T track is not deformed, but only a portion outside the T-shape near the periphery of the rivet head, as seen in cross section.

FIG. 15 is a perspective view from a different angle of the same arrangement shown in FIG. 14A-B to reveal in greater detail the presence and arrangement of a Hall effect sensor 1401 housed in a sensor housing 1502, and its electric link 1501 both provided within the arrangement 1101. This sensor 1401 is used here in a similar fashion to sensor 0401 briefly described in connection with FIG. 4, ie to detect the presence of a rivet C under the punch 1206. The operation of the sensor, including the operation of this and alternative arrangements including such sensor, will be described in further detail below.

We have so far described various possibilities for preparing the fasteners for the fastener setting operations using different nose arrangements and transfer means located therein. We will now focus on the provision of nose assemblies 0106 of the type already briefly described in connection, for example, with FIG. 1, for guiding the punch and/or the rivet once that the punch has collected and removed the rivet from the stand-by position, to guide it towards and then on and into the workpiece.

Referring now to FIGS. 16A-F, there is shown a nose assembly 1601 for guiding the punch and a fastener during a fastener setting operation. The nose assembly can be used in any of the nose arrangements described above. The nose assembly is formed by an external housing 1602 with a head 1603 and a tubular body 1604. The tubular body receives the fastener and the punch during the setting operation. In the described arrangements, the punch has a circular cross-section and, accordingly, the tubular body also has a corresponding circular cross section. However, different shapes are possible, and are actually requested, especially to gain access to the workpiece, principally at the distal end where it is desirable to reduce the external envelope of the nose assembly, without compromising the functionality of the setting tool. The tubular body extends longitudinally in an axial direction corresponding with the direction of travel of the punch. The tubular body is defined by a cylindrical wall 1605.

A fluid communication port 1606 is provided on the head 1603. Two fluid galleries 1607 extend longitudinally through the wall 1605. In the described nose assembly, the fluid communication port 1606 is in fluid communication with both fluid galleries 1607. Otherwise, another port 1606 could be provided for example on an opposed side and each port could be in fluid communication with one of the galleries. It will also be understood that more than two galleries, or just one, are also possible. In this manner, a fluid such as, for example, compressed air can be blown into and through the fluid gallery 1607. The fluid gallery 1607 is also in fluid communication with a passage 1608 defined through the nose assembly 1601 by the tubular body (this is where the fastener and the punch are guided) at the distal or lower end 1609 of the tubular member 1604 so that the compressed air can be blown into the passage 1608 to create a pressure inside the passage 1608. This pressure acts on the rivet (as a floating piston) to keep it in contact with and stabilised on the punch face to maintain a correct orientation within the nose assembly 1601 during the setting operation, just before the rivet is embedded into the workpiece (not shown).

Figure 16F:
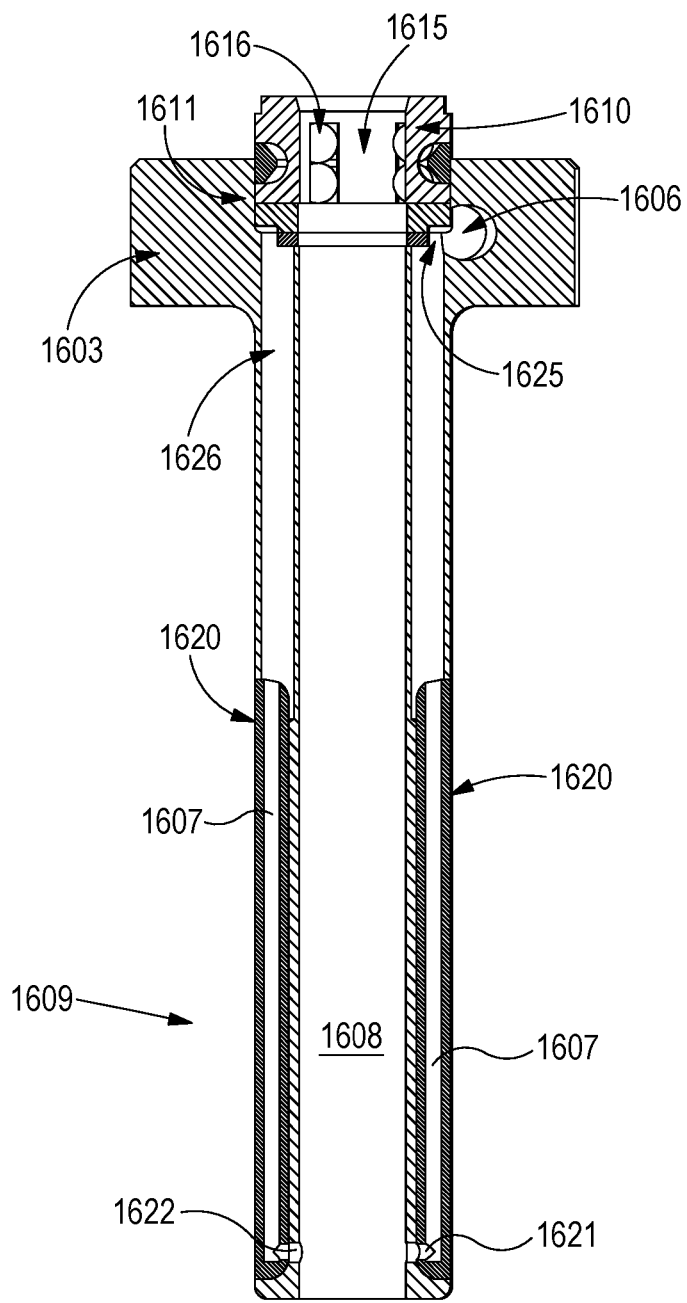

At least a portion of each fluid gallery 1607 is provided as an axially extending wall insert 1620 to avoid a difficult manufacturing operation involving long depth drilling of small diameter. The described tubular member 1604 includes two such galleries disposed in opposition (ie angularly spaced of exactly 180 degrees) one to the other as seen in FIGS. 16B, D and F. Each wall insert 1620 is inserted into a corresponding axially extending recess 1631 provided externally on said wall 1605 of the tubular body 1604. The wall inserts 1620 extend to the distal end 1621 of said tubular body 1604, as also seen from FIGS. 16A and D, for example. Further, the wall inserts 1620 each comprise a first transversally extending passageway 1621. This passageway 1621 in fluid communication with a second transversally extending passageway 1622 provided on the wall 1605 at a distal end 1621 of the tubular member 1605, as also shown in FIGS. 16B, D and F. In FIGS. 16 A and C, one of the wall inserts 1620 can be seen in its entire axial length. In FIG. 16 F, both wall inserts 1620 can be seen in cross section in their entire length. FIG. 16F in addition reveals how the fluid communication port 1606 communicates simultaneously with the two galleries 1607. This is via an annular chamber 1625 formed at the proximal end 1626 of the galleries 1607 within the wall 1605 of the tubular member 1604.

As also shown in FIG. 16A, the nose assembly 1601 further includes a fastener centralisation means 1610 for centralising the rivets in ingress into the nose assembly 1601. In the described nose assembly 1601 the fastener centralisation means 1610 is a short tubular insert 1610 coupled to the head 1603. The tubular body 1604 is in fastener-receiving communication with this short tubular insert 1610 as can be seen from, for example, FIG. 16E. The head 1603 has a central recess 1611 that receives the tubular insert 1610, which is interference fitted to the head 1603, although other coupling methods would be possible. The head 1603 has connection means 1612 for connecting the nose assembly 1601 to the nose arrangement in the form of two bores 1602 disposed on opposed ends of the housing head for receiving one or more respective bolts (not shown). The housing head also has two side flats 1613 for registering the nose assembly in place within the nose arrangement as shown in FIG. 16A.

The tubular insert 1610 has three axially extending grooves 1614 each for accommodating two vertically disposed centralising spheres 1617 which are both resiliently biased inwardly towards the axis of the tubular insert. The spheres 1617 partially protrude within a short passageway 1615 defined by said tubular insert 1610. The spheres 1617 thus define three axially extending sphere stacks 1616 which are equally angularly spaced around the tubular insert as shown in FIGS. 16C and E.

The protruding spheres 1617 are resiliently biased by a resiliently biasing medium 1618 accommodated within the tubular insert 1610 located outwardly with respect to said spheres. In the described centralisation device 1610, the resiliently biasing medium 1618 is in the form of a ring 1618 (made for example of a complaint material such as a polymer). The ring has a polygonal cross-section tapered inwardly so that the ring 1618 projects in the space between two stacked spheres 1617. The ring 1618 is received on a recess 1609 located on an axially extending external surface of the tubular insert 1610. The ring is thus compressed between the spheres 1617 and the central recess 1611 for receiving the tubular insert 1610. A further resilient member 1619 is arranged axially between the tubular insert 1610 and the tubular body 1604 so as to provide an air seal at the contacting surfaces. This seal enables the fluid communication between the port 1606 and the galleries 1607 as explained above.

A rivet is thus guided by the punch first through the centralising device 1610. This device 1610 is responsible for centralising the rivet with respect to the punch during the fastener setting operation. The centralised rivet and the punch, travel in contact one with the other, in the passage 1608 defined by the tubular member 1604. As mentioned above, the pressure created by compressed air injected through the fluid communication port 1606 into the passage 1608 helps maintain a correct relationship between the punch and the rivet throughout the rivet setting operation. The rivet, therefore, impacts the workpiece at the required instant, and/or according to a desired configuration relative to the punch, and the punch can therefore reliably inserts the rivet into the workpiece.

Note that the distance between the fastener centralisation means at the proximal end of the nose assembly (or any rivet controlling or centralising means at the proximal end of nose piece) and the collecting element, for example the magnet, on the moveable member of the transfer mechanism is important to ensure that a rivet being transferred from the transfer mechanism to the nose assembly cannot lose orientation, ie for example tumble. Ideally the distance between the lower edge of the collecting element and the upper edge of the nose assembly would be less than the length of a rivet.

It will be appreciated that the presence of wall inserts 1620 allows portions of the fluid galleries to be machined through the wall 1605 of the tubular member 1604 according to traditional methods, for example by machining the recesses 1631 and then drilling those gallery portions. Alternatively, the tubular member 1604 may be manufactured as a single component using additive manufacturing, due to its complex shape.

With reference to FIGS. 17, 19 and 21, there are shown three further nose assemblies 1701, 1901, 2101 for a nose arrangement as described herein. Each of these three nose assemblies comprises a housing 1702, 1902, 2102 with a head 1703, 1903, 2103 and a tubular body 1704, 1904, 2104, similar to the arrangement described above.

A nosepiece 1730, 1930, 2130 for receiving the rivet and the punch is frictionally inserted into the tubular bodies and incorporates one or more magnetic elements 1731, 1931, 2230. A magnetic sleeve element 1832, 2032, 2230 is generally disposed at a distal end 1732, 1932, 2132 of the nosepiece 1730, 1930, 2130, so that the positioning of the rivet with respect to the punch can be maintained, as a minimum, in the instants that just precede the setting of the rivet into the workpiece. This will be described below in connection with FIGS. 23-26, which show sequences relating to the punch and rivet as they travel in the nosepieces, as the rivet contacts the workpiece, and as the punch positions the rivet on the workpiece just before the rivet is embedded into the workpiece.

The distance between a distal edge 2401 of the magnetic element disposed at the distal end of the nosepiece and a distal edge of the tubular body of the housing that comes into contact with the workpiece is a controlled parameter "S". Said distance, S, is in most applications equal, or at least similar, to the axial length of the rivet to be installed.

The nosepiece 1730, 1930, 2130 extends for at least substantially the entire length of the tubular body. However, the nosepiece 1730, 1930, 2130 extends longitudinally further than the housing at a proximal end thereof thus defining a nosepiece insertion portion 1735, 1935, 2135 for insertion into the nose arrangement. This proximal portion 1735, 1935, 2135 of the nosepiece first receives the rivets into the nose assembly. In the nose assemblies of FIGS. 17-20, at least one magnetic element extends further than the housing at this proximal end of the nosepiece. The housing incorporates features already described in connection with the nose assembly of FIG. 16 (such as the connection bores, the corresponding bolts and the flats on the housing head), and will therefore not be described further.

The arrangement of FIGS. 17-20 includes three magnetic elements that extend axially along the nosepiece. These magnetic elements are in the form of magnetic bars and/or magnetic strips including a holder and a permanent magnet. The magnetic elements are each received in a respective recess provided on a longitudinally extending external surface of the nosepiece. The centrally located magnetic element is disposed at a slightly different angular location around the nosepiece than the proximal and distal magnets.

The magnets, however, are disposed adjacent one to another so as to overlap at least partially in the axial direction, as shown in FIGS. 18A and 20A. The longitudinal extension of the magnets is such that they generate a magnetic force that is exerted substantially uninterruptedly for the length of the nosepiece.

The nose assembly of FIG. 18 comprises a fastener centralisation device 1833 for centralising the rivet just before the rivet is forced into the workpiece. The features of the fastener centralisation device 1833 are not described in detail here as a description has already been included in connection with FIG. 16—the same principles apply. However, in the present nose assembly, the centralising device 1833 is integrally formed with the nosepiece.

With reference to FIG. 23, a rivet setting sequence is illustrated wherein the rivet and the punch travel in the nose assembly 1930 represented in FIG. 19. Since the rivet D is attracted by the magnet 2032, the rivet D is prevented from free falling in the nosepiece 1930, and/or from tumbling, thereby becoming inverted with respect to the punch, as shown in FIG. 23A. The rivet D travels in the nosepiece 1930 always under the thrust of the punch.

Figure 23A:
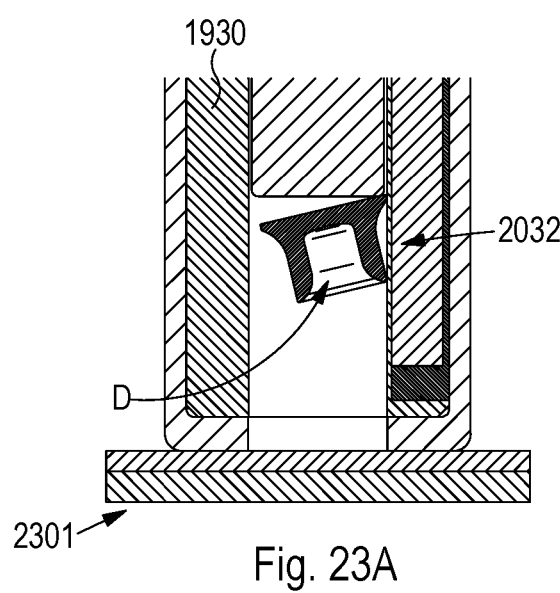
Figure 23B:
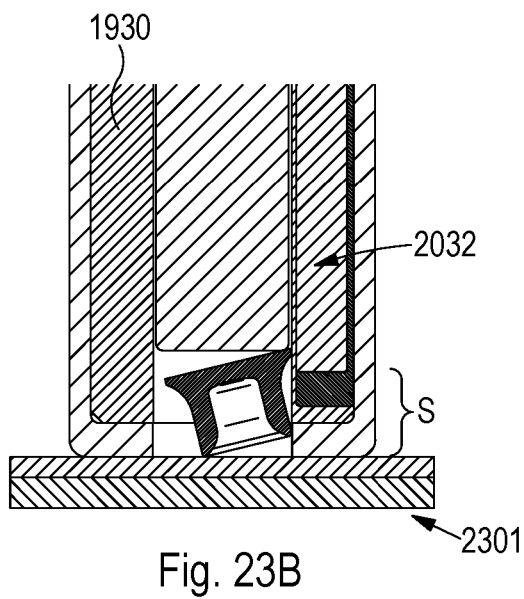

In FIG. 23B, the rivet D first contacts the workpiece 2301. As can be appreciated from this Figure, the rivet is now substantially free from any interaction with the magnet 2032, since the magnet's lower edge is axially spaced a distance S above the workpiece 2301. Accordingly, at this time, the rivet is relatively more able to locate in place on the workpiece 2301 under the punch.

Figure 23C:
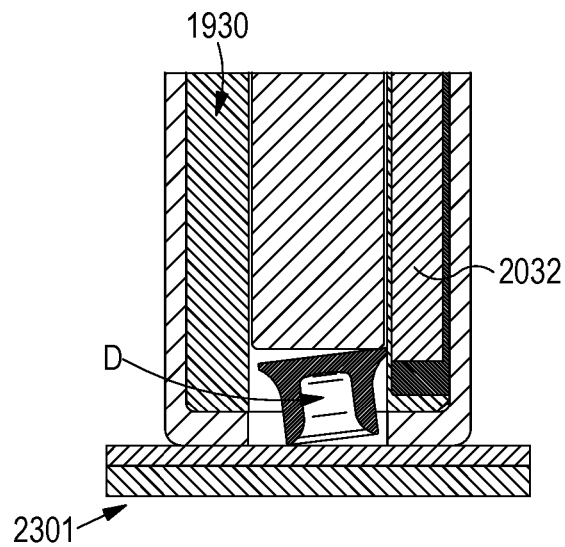
Figure 23D:
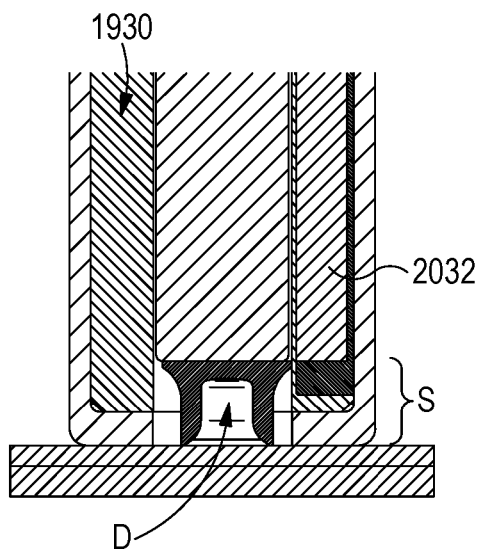

The sequence in FIG. 23C shows the rivet D as it is slightly rotated clockwise under the action of the punch, until square abutment with the workpiece 2301 is reached, as shown in FIG. 23D.

The sequence in FIG. 23D shows the full abutment of the rivet D with the workpiece 2301. This is also the instant just before the embedding action of the punch initiates. As can be appreciated from FIG. 23D, at this instant, the rivet D is still slightly off-centre, as the rivet head is still engaged to, or very close to, the internal surface of the bore of the nosepiece.

Rivet joints made under these conditions may still have acceptable properties, depending on the application, if the concentricity between the punch and the rivet at this instant is within acceptable margins. The magnets 1931, 2032 located in the nosepiece have guided the rivet D substantially all along its descent towards the workpiece 2301. This is made possible by the relative positioning of the magnets 1931, 2032 which together cover substantially the entire length of the nosepiece. During its descent, the rivet D is thus always attracted against the internal surface of the bore of the nosepiece.

FIG. 24 shows a sequence similar to that shown by FIG. 23, however involving the nose assembly of FIGS. 21 and 22. Initially (FIG. 24A) the rivet E undergoes free fall within the bore in the nosepiece. The magnetic sleeve element 2230 only interacts with the rivet E just prior the rivet E touches the workpiece 2301. Again, as represented in FIG. 24B, the lower edge 2401 of the magnetic sleeve element 2230 is axially spaced a distance S, sufficiently from the workpiece 2301, to allow the rivet relatively freely to rotate and achieve the required orientation/abutment on the workpiece 2301. As shown in FIG. 24C, under these conditions the punch collects the rivet E and the magnetic sleeve 2230 centralises it on the workpiece 2301 with respect to the punch. Since the magnetic sleeve 2230 only extends at the distal end of the nosepiece, the magnetic force interacts with any rivet E only in proximity of the workpiece.

FIG. 25 shows a sequence similar to that shown by FIGS. 23 and 24, this time however involving the nose assembly of FIGS. 17 and 18. Initially (FIG. 25A) the rivet F is prevented from undergoing free fall within the nosepiece under the influence of the upper magnets 1731. The lower magnetic element 1832 then attracts the rivet F in the instants before the rivet F touches the workpiece 2301. This nosepiece incorporates a centralising device 1833 similar to that described in connection with FIG. 16. This device 1833 centralises the rivet F just before the rivet is embedded into the workpiece 2301. Again, as represented in FIG. 24B, the lower edge 2401 of the magnetic element 2230 is axially spaced of a distance S from the workpiece 2301 sufficient to allow the rivet F to relatively freely rotate and achieve the required orientation and position on impact with the workpiece 2301. As shown in FIG. 25B, the punch collects the centralised rivet F, and the centralised rivet F is then forced onto the workpiece. Certain applications may favour the nosepiece of FIGS. 17-18.

In FIG. 26, a number of ring-shaped magnetic elements 2630 are arranged in axial spaced relationship along the nosepiece at equal axial intervals. Alternative arrangements (not illustrated) could comprise half magnetic rings, which would be easier to integrate into the nosepiece.

Each magnet 2630 is accommodated within a corresponding sleeve formed on an axially extending internal surface of the nosepiece. The magnets are axially arranged according to alternate polarities, as illustrated by the different shadings in FIG. 26.

Such magnets could be correlated magnets, ie magnets whose polarities has been 'induced' according to predetermined patterns.

In the arrangement of FIG. 26, some magnetism is induced on the punch 2640 as the punch travels through the magnetic rings 2630. This induced magnetism is able to hold the rivet J in central relationship on the punch, as it travels through the nosepiece, as seen in FIG. 26A—due to the axial-symmetry of the arrangement. In FIG. 26B, the rivet J contacts the workpiece 2301, in readiness for being inserted therein. Rivet J is represented as a smaller diameter rivet that would typically be passed through such a nosepiece. The configuration of FIGS. 26A-B enables a range of reduced rivet diameters to work suitably within a nosepiece having a predetermined bore diameter.

FIGS. 27-35 illustrate the possible provision of a Hall effect sensor in the nose arrangements described herein, and elsewhere. Arrangements comprising such a sensor have also been shown with reference to FIGS. 5-6 and 11-15, and will now be described in more detail.

Hall effect sensors are compact sensors that can detect small changes in the magnetic field generated by a magnet. This happens for example when the magnetic field generated by a magnetic element provided to collect or hold a rivet is perturbed by the presence of the rivet. Hall effect sensors are therefore particularly suited to applications including rivets and magnetic elements for holding the same. However, it will be appreciated that attraction of the rivet is not essential and that a Hall effect sensor would in principle work also in case of repulsive magnetic interaction of the magnet with the rivet (or other fastener). This arrangement may, however, be less preferred in connection with the present fastening applications.

Accordingly, FIG. 27A shows in perspective the mutual positions of a permanent neodymium magnet 2701, a rivet G and a Hall effect sensor 2702. The magnet 2701 could be that incorporated into any rivet transfer device described herein. However, as it will be described with reference to FIGS. 33-35, the magnet could be located elsewhere, and the relative position of the sensor with respect to the rivet and/or the magnet could be different. Further, it will also be appreciated that the magnet may or may not be provided with the function to perform a predetermined interaction on a rivet (for example, for holding the rivet). For example, the magnet could be provided merely to activate or enable the sensing of the Hall effect sensor. In other words, arrangements where the magnet is devoid of any meaningful interaction with the rivet are possible, insofar as the magnetic field is susceptible to undergo measurable variations in the presence or absence of rivets, or in connection with rivets of different sizes and/or shapes. This will further be described below.

FIG. 27B provides various dimensions in millimetres relating to the arrangement shown in FIG. 27A. FIG. 28 corresponds to the arrangement of FIG. 27, and, as can be appreciated from the dimensions provided in the Figures, includes a rivet G having a stem measuring nominally 3 mm in diameter. FIG. 29 is similar to FIGS. 27 and 28, but shows a rivet H having a stem measuring nominally 5 mm in diameter (and, accordingly, has a wider head diameter than the rivet G).

FIG. 30 illustrates schematically three selected magnetic field lines 3001 generated by the neodymium magnet 2701 of FIGS. 27-29. In the presence of a rivet G, H, the magnetic field is locally altered, at the sensor location, by the presence of the ferromagnetic material of which the rivet is made. The alteration of the magnetic field results into a variation of magnetic flux B experienced by the Hall effect sensor.

The sensor location is identified in FIG. 30 by parameters "h" and "d", namely: an offset of the sensor 2702 in depth-wise direction with respect to the nose arrangement (refer to FIGS. 5-6 for example) from a nominal line or plane extending from the centre of magnetic element 2701 through the rivets G, H; and, a distance of the sensor from a proximal face 2703 of the magnet 2701 measured along that line or plane, respectively.

According to FIG. 27B, "h"=5.3 mm and "d"=5.6 mm in the described arrangement. It has been found that if "h" is approximately equal to 1 to 1.5 times the stem of the rivet, sensing of the rivets is facilitated. Likewise, it is preferred (but not essential) that the magnetic field lines impinge on the sensor face at about 90 degrees, or, preferably according to an angle "a" as shown in FIG. 30 not less than 60 degrees. Accordingly, the preferred locations of the sensor 2702 in FIG. 30 are long line "b".

Table 1 below provides the basic concept of how the magnetic flux B may vary at the sensor location. X corresponds to the value of B without rivet and "a" and "b" represent changes in value for B due to, respectively, the presence of the rivet G or H, respectively. A larger rivet induces a larger change in magnetic flux B, as sensed by the Hall effect sensor 2702.

TABLE 1

| Magnetic Flux B at a given point represented by dimensions "h" & "d" of FIG. 30 | | |
|---|---|---|
| | | Sensed B |
| Starting value, ie, no rivet | X | X |
| Change in value caused by small rivet (3 mm) | a | X-a |

TABLE 1-continued

| Magnetic Flux B at a given point represented by dimensions "h" & "d" of FIG. 30 | | |
|---|---|---|
| | | Sensed B |
| Change in value caused by large rivet (5 mm) | b | X-b |
| | | Where b > a |

FIG. 31 represents the magnetic flux B experienced by the Hall effect sensor as a function of the presence or absence of a rivet G, H captured by the magnet 2701, and as a function of the size of the rivet expressed as the nominal rivet stem diameter and the distance d of the sensor from the magnet. It is interesting to note the presence of a 'nearly linear' sensing zone between approximately d=4.5 mm and d=6.5 mm. In this zone, detection and characterization of the rivets is facilitated, for example in comparison to the range d=2-4 mm. However, through adequate calibration it would be possible to use the Hall effect sensor outside this region.

The sensed intensity of the magnetic flux B is transformed by the Hall effect sensor into an output voltage V, as shown in FIG. 32. The sensor voltage output (V) (shown in FIG. 32) is proportionally changed by the magnetic flux values (subject to an initial calibration of the sensor), the change being sufficient to provide a differentiating signal output between the conditions of; 'no rivet' or 'small 3 mm rivet' and 'large 5 mm rivet'.

If the supports described in connection with the nose arrangements described herein and/or the transfer means are made of a non-ferromagnetic material, the signal to noise ratio experienced by the Hall effect sensor is improved. In other words, a lower background noise level is experienced in connection with the measurement effected by the Hall effect sensor.

The magnet shown in FIGS. 27-30 is a neodymium magnet. However, as it will be appreciated other types of magnets may also be used. Further, the magnet is in the form of a bar having a generally rectangular cross-section arranged generally parallel with respect to the punch. The magnet has opposed polarities defined either side of a centre plane passing through the magnetic element, generally parallel with respect to the punch.

As shown in FIGS. 27-30, which correspond to the arrangement previously shown in FIGS. 5-6, the Hall effect sensor is arranged in proximity of the stand-by position for detecting the presence of a fastener in the stand-by position. Alternatively, the Hall effect sensor may be arranged in proximity of the fastener transfer area for detecting the fastener presence in the fastener transfer area. This is of course enabled by the magnet carried by the transfer mechanism described herein which collects the rivets at the fastener transfer area.

Accordingly, various methods involving the Hall effect sensor described herein may be devised, for example, a method of detecting a fastener in a stand-by position under the punch of a fastener setting tool.

First, a nose arrangement comprising a Hall effect sensor as described herein is provided. The signal provided by the Hall effect sensor is monitored and compared to a reference signal or value to detect the fastener.

As an alternative example, a method of detecting a retracted position of a punch of a fastener setting tool may be devised.

First, there is provided a nose arrangement where the Hall effect sensor is positioned in proximity of a fastener transfer area. Again, the signal provided by the Hall effect sensor is monitored and compared to a reference signal or value to detect the retracted position of the punch which corresponds to the absence of ferromagnetic material in the area probed by the sensor. Similarly, it would be possible to detect the transit of the punch rather than its retracted position. This information can be used in the fastening applications, for example to actuate the transfer means only when the punch has been detected as retracted, or to provide an input for the setting tool to be relocated for a subsequent operation.

FIGS. 33A-C depict a further arrangement including a magnet 3301, rivets K, and a Hall effect sensor 3302, incorporating a rotary pin escapement 3303 used in a rivet feeding line 3304. The rivet feeding line is represented by portions of flexible tubing 3305 coupled to a rivet track portion 3306 internal to the escapement 3303. However, it will be appreciated that the arrangement could likewise be provided for example within a substantially rigid magazine for feeding rivets to a setting tool. In this case, the rivet delivery track would be substantially rigid.

The rotary pin escapement comprises a rotary cam 3307 in the form of two pins 3308 that are rotatably disposed with respect to the rivet track portion 3306 so as to stop, trap or release one or more rivets K. The mechanism of handling the rivets will not be described in further detail herein. However, it will be appreciated the position of the magnet 3301 which is adjacent the rivet track portion 3306 inside the escapement 3303. The magnet 3301, in this instance, is not designed to carry out any specific action on the released rivet K' or on any of the queuing rivets K". The only function of the magnet is that of enabling sensing of the released (or to-be-released, as the case may be, depending on the angular orientation of the rotary cam 3307) rivet K' at the magnet location. The information can be used as an input in connection with the control of the corresponding fastener setting operation.

It could in general be advantageous to position magnets with or without sensors in a series of positions and/or alignments on the path in a rivet supply line, such as for example inside a refillable rivet magazine for the purposes of:

a) providing a velocity brake for a rivet or rivet train;

b) providing a holding position or series of holding positions for one or a small train of rivets, eg, if magazine is upside down, to restrict the rivet train from falling completely away from the escapement area and the train needing to be drawn up to the escapement area each time a single rivet is required, thus creating constant agitation, wear and tear on parts and damage to rivets. This arrangement could be akin to a one way gate, whereby air pressure pulls the rivet(s) past the magnet but the weight of rivets alone under gravity is insufficient to pass the magnet;

c) providing a level sensor or more level sensors in the magazine to monitor fill levels; and, d) providing a means of switching the magnetic field on and off, eg, electro-magnet or displacing or rotating a directional correlated magnet. This would provide a means of achieving the above at b) without the need to balance the relationship between kinetic energy of rivet via air pressure and gravitational force.

FIGS. 34A-C illustrate an alternative nose arrangement 3405 including two magnets 3401 3402, rivets L, and a Hall effect sensor 3403. The nose arrangement 3405 also includes a linear pin escapement 3406 for transferring the rivets L under the punch 3407.

As seen in FIG. 34B, the transferred rivet L' has been transferred under the punch 3407 and, from that position will be set into a workpiece (not shown), when required, by operation of the punch 3407. The transfer of the transferred rivet L' from a rivet transfer zone 3415 close to the punch (where the rivet L' has awaited to be transferred under the punch) is enabled by actuation/retraction of the lead pin 3408 of the linear pin escapement 3406. The corresponding actuator 3410 is also visible in FIG. 34B, together with its connections 3411. The described actuator is pneumatic, but alternatives are possible, for example an electric actuator could be used in its place.

The lead pin 3408 retracts until its lower face 3409 is substantially flush with the lower face 3412 of the punch 3407 when this is in its retracted position. A quantity of compressed air moves the rivet L' under the punch. In this position, the rivet L' is kept within mechanical probes 3416 as known in the art. The Hall effect sensor senses the presence of the current rivet L" in the rivet transfer zone in cooperation with the magnet 3402 facing towards the feeding line.

Alternatively, the Hall effect sensor could be located behind the punch 3407, as described for example in connection with FIGS. 14 and 15. In this position, the Hall effect sensor would predominantly sense the magnetic field generated by the other magnet 3401 facing the punch 3407. This field will interact with any rivets L disposed in the stand-by position. This magnet 3401 is also provided so as to stabilise and/or adequately orient the rivet in the stand-by position. Further pins (not shown) part of this escapement 3406 may hold rivets L in proximity of the rivet transfer zone 3415 when the compressed air is blown to effect the transfer of the rivet under the punch.

FIGS. 35A-C show yet another nose arrangement 3505 including four magnets 3501, 3502, 3503, 3504, rivets M, N fed from opposite sides of the punch 3507, and two Hall effect sensors 3510, one visible from FIGS. 35A and 35C at the front of the arrangement 3505, and one (not visible) at the back, symmetrically disposed with respect to the front sensor 3510.

The arrangement comprises two escapements 3520, 3530 of the type first described in conjunction with FIG. 34. Their function will therefore not be described again. Pairs of sensors 3501, 3502 and 3503, 3504 are disposed on two opposed lead pins 3521, 3531 located either side of the punch 3507. Again, the arrangement is in every respect analogous to that of FIGS. 34A-C and will therefore not be described again.

As evident, the rivets M, N can now be supplied from the left or right hand sides of the punch 3507. This may reduce the duty cycle of the riveting operations (other conditions being the same).

Further, different shapes and/or sizes of rivets may be supplied to the nose arrangement 3505 from one side and from the other side in this mirrored arrangement. This may be highly desirable in certain fastening application.

Applications relating to self-piercing rivets of the type described herein comprise, but are not limited to, the manufacturing of vehicle such as automobiles or parts thereof or therefor.

The invention has been described above in connection with the Figures purely to enable the skilled person to carry out the invention across the scope of the appended claims. Accordingly, protection is sought based on the scope of the appended claims.

The invention claimed is:

1. A nose arrangement for a fastener setting tool having a punch for setting fasteners, the nose arrangement comprising:

a support for supporting the nose arrangement on the setting tool, the support being adapted to receive the punch;

a nosepiece for guiding the punch and a fastener during a fastener setting operation;

the nose arrangement defining first and second fastener transfer areas situated laterally with respect to the punch, wherein the fasteners can wait to be transferred from the transfer areas to under the punch;

a transfer mechanism for transferring the fasteners from the first and second fastener transfer areas to under the punch, the transfer mechanism comprising a movable member that can be moved between first and second configurations;

wherein in the first of said configurations, the movable member is configured for holding a first fastener in a stand-by position under the punch, waiting for a fastener setting operation, and is configured for collecting a second fastener from the first fastener transfer area, and, wherein in the second of said configurations the movable member is configured for holding the second fastener in said stand-by position, and is configured for collecting a third fastener from the second fastener transfer area.

2. The nose arrangement of claim 1, wherein the first and second fastener transfer areas are disposed, in use, on opposed sides with respect to the punch.

3. The nose arrangement of claim 2, wherein the movable member is elongated and has, in use, an extension in a substantially parallel direction with respect to the punch, and is pivoted within the nose arrangement.

4. The nose arrangement of claim 1, wherein the movable member comprises at least one magnetic face for holding and collecting the fasteners, said magnetic face being disposed on a side of the movable member.

5. The nose arrangement of claim 4, wherein the movable member comprises two such magnetic faces, each for holding and collecting the fasteners, disposed on opposed sides of the movable member.

6. The nose arrangement of claim 1, wherein the transfer mechanism comprises an actuator for moving the movable member between the first and second configurations.

7. The nose arrangement of claim 1, wherein the movable member comprises back and front plates supporting a rivet carriage in between configured to receive the punch therethrough during a fastener setting operation.

8. The nose arrangement of claim 7, wherein said moveable member is configured such that it is actuated by the punch during a fastener setting operation.

9. The nose arrangement of claim 1, further comprising limiting means for limiting the movement of the movable member between said first and second configurations.

10. The nose arrangement of claim 1, wherein the nose arrangement further comprises at least one chute and/or a magazine for supplying the fasteners to the first and/or second fastener transfer areas, the chute and/or magazine having a proximal end, an outlet, and a fastener delivery track.

11. The nose arrangement of claim 10, wherein the chute and/or the magazine define a substantially undeformable fastener delivery track for delivering the fasteners;

optionally wherein the magazine is a removable magazine.

12. The nose arrangement of claim 10, wherein the movable member is adapted to form a sealed interface with the outlet of the magazine and/or chute when the movable member is in the first and/or second configurations.

13. The nose arrangement of claim 10, wherein each chute and/or magazine comprises an in-line escapement provided at said proximal end, on the outlet of said chute and/or magazine for holding the fasteners in the first and/or second fastener transfer areas.

14. The nose arrangement of claim 13, wherein said in-line escapement is configured to be operated by the movable member to release a fastener when the movable member is in the first and/or the second configuration.

15. The nose arrangement of claim 13, wherein said in-line escapement comprises:

one or more resiliently biassed jaw members for retaining the fasteners before the fasteners are released; or a portion of the fastener delivery track located in said chute and/or magazine, wherein said track portion comprises at least one splitted-track arrangement, said splitted-track arrangement comprising a longitudinally splitted track segment pivotally arranged on said track portion, wherein said splitted track segment is resiliently biased around said pivot so as to deform said fastener delivery track to trap one or more fasteners in said track portion; or one or more sets of pins actuated by an external actuator for holding and releasing the fasteners.

16. The nose arrangement of claim 1, wherein the moveable member comprises a linear slider disposed in a guide located within the nose arrangement.

17. A setting tool comprising the nose arrangement of claim 1.

18. A robotic arm comprising the setting tool of claim 17.

19. A method of preparing fasteners for a setting operation in a fastener setting tool having a punch for setting the fasteners, the method comprising:

providing a nose arrangement comprising:

a support for supporting the nose arrangement on the setting tool, the support being adapted to receive the punch for setting the fasteners;

a nosepiece for guiding the punch and a fastener during a fastener setting operation;

the nose arrangement defining first and second fastener transfer areas situated laterally with respect to the punch, wherein the fasteners can wait to be transferred under the punch;

a transfer mechanism for transferring the fasteners from the first and second transfer areas under the punch, the transfer mechanism comprising a movable member that can be moved between first and second configurations;

moving the transfer mechanism into the first configuration, wherein in the first configuration the movable member is configured for holding a first fastener in a stand-by position under the punch waiting for a fastener setting operation, and for collecting a second fastener from the first fastener transfer area; and, moving the transfer mechanism into the second configuration, wherein in the second configuration the movable member is configured for holding the second fastener in said stand-by position, and for collecting a third fastener from the second fastener transfer area.

20. A method of manufacturing a vehicle or a part thereof by setting one or more fasteners thereon, the method comprising:

providing a nose arrangement comprising:

a support for supporting the nose arrangement on the setting tool, the support being adapted to receive the punch for setting the fasteners;

a nosepiece for guiding the punch and a fastener during a fastener setting operation;

the nose arrangement defining first and second fastener transfer areas situated laterally with respect to the punch, wherein the fasteners can wait to be transferred under the punch;

a transfer mechanism for transferring the fasteners from the first and second transfer areas under the punch, the transfer mechanism comprising a movable member that can be moved between first and second configurations;

moving the transfer mechanism into the first configuration, wherein in the first configuration the movable member is configured for holding a first fastener in a stand-by position under the punch waiting for a fastener setting operation, and for collecting a second fastener from the first fastener transfer area; and, moving the transfer mechanism into the second configuration, wherein in the second configuration the movable member is configured for holding the second fastener in said stand-by position, and for collecting a third fastener from the second fastener transfer area.

* * * * *